US009262743B2

(12) United States Patent
Heins et al.

(10) Patent No.: US 9,262,743 B2
(45) Date of Patent: Feb. 16, 2016

(54) METHOD AND APPARATUS FOR SOCIABLE COMPUTING IN AD-HOC AND CONFIGURED PEER-TO-PEER NETWORKS

(75) Inventors: Douglas B. Heins, San Francisco, CA (US); Gregory M. Morey, New York, NY (US)

(73) Assignee: ZEROTOUCHDIGITAL, Inc., New York, NY (US)

( * ) Notice: Subject to any disclaimer, the term of this patent is extended or adjusted under 35 U.S.C. 154(b) by 135 days.

(21) Appl. No.: 13/281,223

(22) Filed: Oct. 25, 2011

(65) Prior Publication Data

US 2012/0042000 A1 Feb. 16, 2012

Related U.S. Application Data

(63) Continuation-in-part of application No. 12/758,211, filed on Apr. 12, 2010, now Pat. No. 8,073,908, which is a continuation of application No. 12/496,781, filed on Jul. 2, 2009, now Pat. No. 7,716,286, which is a continuation-in-part of application No. 10/733,830, filed on Dec. 10, 2003, now Pat. No. 7,610,207.

(60) Provisional application No. 61/452,864, filed on Mar. 15, 2011, provisional application No. 61/514,294, filed on Aug. 2, 2011, provisional application No. 61/533,957, filed on Sep. 13, 2011.

(51) Int. Cl.
*G06F 15/16* (2006.01)
*G06Q 10/10* (2012.01)

(52) U.S. Cl.
CPC ..................................... *G06Q 10/10* (2013.01)

(58) Field of Classification Search
USPC .......................... 709/201, 204–205, 223–224
See application file for complete search history.

(56) References Cited

U.S. PATENT DOCUMENTS

| 5,606,493 | A | 2/1997 | Duscher et al. |
| 5,778,227 | A | 7/1998 | Jordan |
| 6,128,647 | A | 10/2000 | Haury |
| 6,782,398 | B1 | 8/2004 | Bahl |

(Continued)

OTHER PUBLICATIONS

Peer-to-Peer Techniques for Data Distribution in Desktop Grid Computing Platforms, Costa et al., Proceedings of the CoreGRID Workshop on Programming Models Grid and P2P System Architecture Grid Systems, Tools and Environments, pp. 1-12, Aug. 30, 2007.

(Continued)

*Primary Examiner* — Philip B Tran
(74) *Attorney, Agent, or Firm* — DLA Piper LLP (US)

(57) ABSTRACT

Executing a program structure for spanning a thread of control and a thread of execution across multiple peers in a peer-to-peer network comprises generating a program structure comprising a plurality of program instructions. A first of a plurality of network peers then executes a portion of the program instructions which initiates the execution of code hosted by said first network peer, where said portion comprising fewer than all program instructions. The first network peer then migrates one or more of the program instructions, including one or more controlling program instructions, together with any requisite data, some of which may include control data, to at least one other of the plurality of network peer. The at least one other network peer then continues execution of the program instructions in accordance with the controlling program instructions and control data until one or more of the objections of the program structure are achieved.

51 Claims, 7 Drawing Sheets

(56) References Cited

U.S. PATENT DOCUMENTS

| | | |
|---|---|---|
| 6,832,223 B1 | 12/2004 | Scheifler et al. |
| 7,043,522 B2 | 5/2006 | Olson et al. |
| 7,136,927 B2 | 11/2006 | Traversat et al. |
| 7,174,370 B1 | 2/2007 | Saini et al. |
| 7,174,381 B2 | 2/2007 | Gulko et al. |
| 7,200,848 B1 | 4/2007 | Slaughter et al. |
| 7,285,047 B2 | 10/2007 | Gelb et al. |
| 7,315,791 B2 | 1/2008 | Ilic et al. |
| 7,395,536 B2 | 7/2008 | Verbeke et al. |
| 7,404,195 B1 | 7/2008 | Sawicki et al. |
| 8,073,908 B2 * | 12/2011 | Heins et al. .................. 709/204 |
| 2004/0019890 A1 | 1/2004 | Verbeke et al. |
| 2006/0155802 A1 | 7/2006 | He et al. |
| 2006/0265710 A1 | 11/2006 | Ansari |
| 2007/0050261 A1 | 3/2007 | Lin |
| 2007/0112574 A1 | 5/2007 | Greene |
| 2007/0142033 A1 | 6/2007 | Deas et al. |
| 2007/0255782 A1 | 11/2007 | Tannenbaum et al. |
| 2009/0125637 A1 | 5/2009 | Matuszewski |
| 2009/0125919 A1 | 5/2009 | Meijer et al. |

OTHER PUBLICATIONS

"Framework for Peer-to-Peer Distributed Computing in a Heterogenous, Decentralized Environment," Verbeke et al., Proceedings of the Third International Woskshop on Grid Computing, 2002.

"A Peer-to-Peer Computing Framework: Design and Performance Evaluation of YML," Delannoy et al., Parallel and Distributed Computing, 2004.

"Coordinated Learning to Support Resource Management in Computational Grids," Lynden et al., Peer-to-Peer Computing, 2002.

Rheeve: A Plug-N-Play Peer-to-Peer Computing Platform, Poon et al., Distributed Computing Systems Workshops, 2002.

"Resource Sharing," Varma, IEEE Potentials, pp. 14-16, 2004.

"Pure Peer-to-Peer Desktop Grid Framework with Efficient Fault Tolerance." El-Desoky et al., Computer Engineering & Systems, 2007.

* cited by examiner

METHOD AND APPARATUS FOR SOCIABLE COMPUTING IN AD-HOC AND CONFIGURED PEER-TO-PEER NETWORKS

RELATED APPLICATIONS

This application is a Continuation-in-Part of U.S. patent application Ser. No. 12/758,211 filed Apr. 12, 2010, which is a Continuation of U.S. patent application Ser. No. 12/496,781 filed Jul. 2, 2009, now U.S. Pat. No. 7,716,286, which is a Continuation-in-Part of U.S. patent application Ser. No. 10/733,830 filed Dec. 10, 2003. This application also claims priority to U.S. Application No. 61/452,864 filed on Mar. 15, 2011, U.S. Patent Application No. 61/514,294 filed on Aug. 2, 2011 and U.S. Patent Application No. 61/533,957 filed on Sep. 13, 2011, the entire contents of which are incorporated by reference.

FIELD OF THE INVENTION

This present invention relates generally to sociable computing in ad-hoc and configured peer-to-peer networks. More specifically, the present invention provides methods and apparatus for the virtualization of shared program execution amongst a "social network of peers" by spanning the programs' control and execution threads across one or more peers and/or across one or more networks.

BACKGROUND

Conventional methods and systems for performing multiple or complex tasks include those characterized as "clustered computing" and "distributed computing." Clustered computing typically involves a program host for storing various programs that define certain tasks or computations, multiple computing engines for performing the various tasks or computations, and a queue manager for assigning the various tasks or computations to the computing engines. In operation, the queue manager assigns various tasks or computations to each of the computing engines. The program host then transmits the appropriate programs, together with required inputs, to each of the computing engines. The computing engines download the programs and execute their required tasks or computations.

Similarly, distributed computing typically involves one or more controller programs running on one or more nodes of a computer network. These controller programs control the launch and operation of multiple component programs, which are also running on one or more nodes of a computer network. In operation, once a distributed application is composed (i.e., component programs, communication routes between component programs, and computing nodes on which the component programs are to be run are all specified a priori), a controller program disseminates launch commands and routing information, which in turn, launches the respective component programs. Once launched, the component programs run continuously and remain connected to the controller program to receive data and further instructions.

As will be appreciated by those of skill in the art, the conventional systems and methods described above each require a central controller entity (e.g., a queue manager or controller program). As a result, these systems are limited by a single point of failure. In other words, if the central controlling entity of the respective systems fails, then the entire system fails. In addition, since the above systems require the transmission and downloading of computer-executable code, the systems are susceptible to viral infection. Notably, none of the conventional systems are able to leverage resources of a peer-to-peer network without requiring a central controller, or without having to transmit and download computer-executable code.

Therefore, it would be desirable to have systems and methods for leveraging a social peer network in a manner that does not require a central controlling entity, nor the transmission and/or downloading of computer-executable code (e.g., program applications).

SUMMARY OF THE INVENTION

The present invention relates generally to methods and systems for spanning a thread of control and a thread of execution across multiple peers in a peer-to-peer network. According to a method, a program structure comprising a plurality of program instructions is generated. Next, a first of a plurality of network peers executes a portion of the program instructions, which in turn initiates the execution of code hosted by said first network peer. The first network peer then migrates one or more of the program instructions, including one or more controlling program instructions, together with any requisite control data, some of which may include control data, to at least one other of the plurality of network peers, where execution of the program instructions is continued in accordance with the controlling program instructions until one or more objectives of the program structure are achieved.

A system in accordance with the present invention may comprise a plurality of network peers in communication with each other, with each of the network peers comprising a memory for storing code, and a processor for executing said code. At least one of the network peers in the system comprises code that when executed, causes said first network peer to generate a program structure comprising a plurality of program instructions, including at least one program instructions for controlling the manner in which at least a portion of the program structure is executed; execute at least a portion of the program instructions, which in turn initiates the execution of additional code hosted by said network peer; migrate one or more of the program instructions, including one or more of the controlling program instructions together with any requisite data, some of which may include control data, to at least one other of the plurality of network peers; and continue to execution of one or more program instructions received from any other of the network peers in accordance to the controlling program instructions.

DETAILED DESCRIPTION OF THE INVENTION

Figure 1:
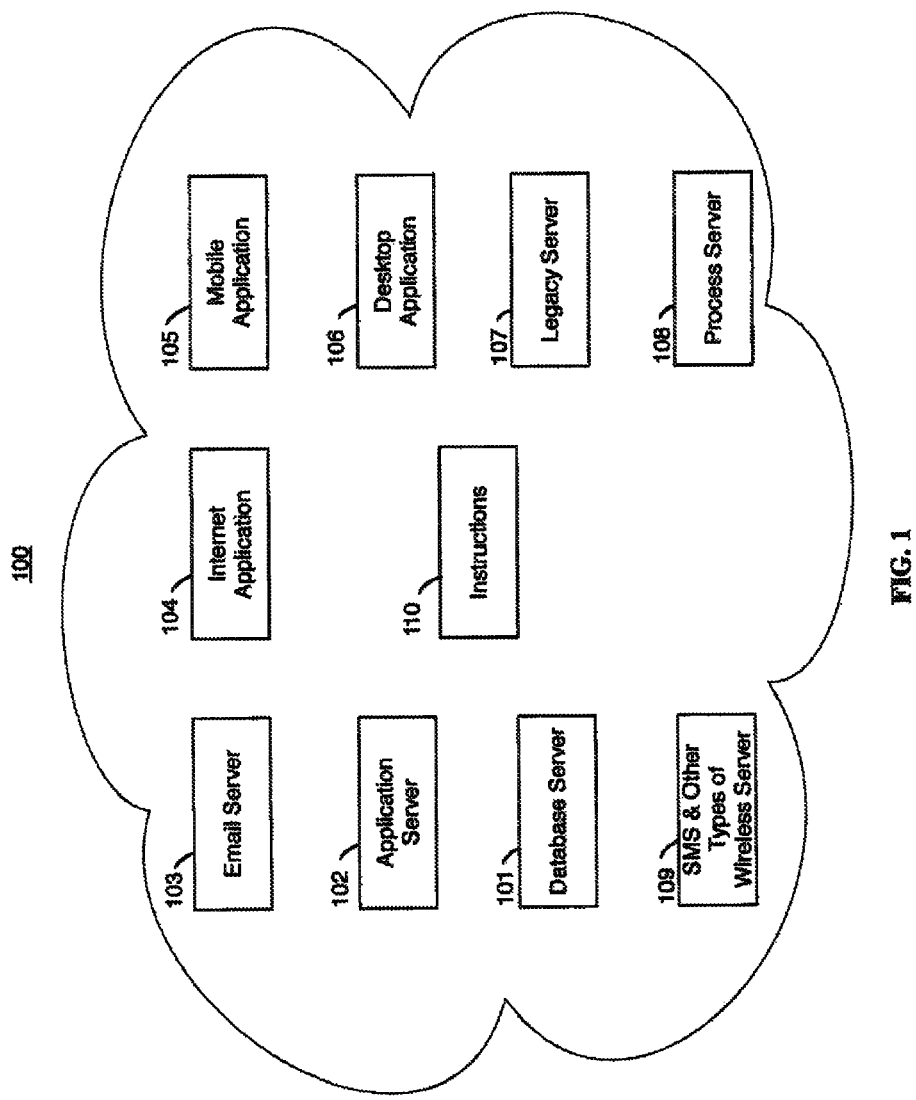
FIG. 1. shows an exemplary network configured in accordance with the present invention.

This present invention relates generally to sociable computing in ad-hoc and configured peer-to-peer networks. Various embodiments of the invention provide methods and processes for utilizing ad-hoc and/or configured networks (including, without limitation, the Internet) as a type of "microprocessor" computing platform, whose processing and execution capabilities are distributed across and throughout network devices. In one aspect, the invention utilizes the Internet as an operating system that enables the creation and execution of a unique and proprietary form of distributed applications whose threads of control and execution may span one or more network devices and their respective operating systems.

Contrary to conventional software applications, whose thread of control and thread of execution remain resident within a single computing device (e.g. a copy of the software program loaded into a computer), and as a result requires deployment and execution of such applications to occur locally (i.e., within the device), the present invention provides for spanning or sharing virtualized threads of control and execution. As understood by those of skill in the art, "threads of control and execution" are conventionally considered physical manifestations implemented by a physical microprocessor architecture imposed upon the physical constructs of compiled machine code and/or byte-code. Virtualized threads of control and/or execution, on the other hand, may be expressed as programs or program structures (defined below) comprised of non-compiled program instructions (also defined below) that are outside of the physical confines of a microprocessor and/or byte-code interpreter, and that are able to migrate and span across multiple peers to virtually control and/or initiate the execution of other program instructions and/or of machine-compiled code (with or without control data), all without having to transmit or download any compiled code (e.g., software programs) onto a computing device. Further, these control structures are able to apply different levels of control to the initiation and execution of the program instructions and/or of machine-compiled code.

In accordance with the present invention, networked devices or "peers" essentially form sociable computing network(s) (where 'sociable' refers to the ability of networked devices to interact, communicate, and/or collaborate to execute program instructions and/or to perform any other computing-type tasks), and may include any device or machine capable of connecting to a wired or wireless network, such as (without limitation) personal computers (PCs), servers, mobile phones, pagers, personal device assistants (PDAs), radio frequency identification (RFID) devices/tags, data sensors, kiosks, automatic teller machines (ATMs), wireless fidelity (WiFi) access points, routers, database devices, embedded multi-dimensional barcodes, global positioning (GPS) devices and equipment, gaming devices, multimedia devices, television/cable set-top boxes, digital still and video/audio motion cameras, security/surveillance equipment, healthcare monitoring equipment, medical imaging devices, assembly line components, point-of-sale terminals, mobile entertainment devices, embedded devices, audio devices, video devices, banking and payment-processing devices, and the like; and machines, equipment, hardware and devices used in business, defense operations, financial securities industries, broadcasting, telecommunications, terrestrial and cable communications, banking, manufacturing, gaming, insurance services, supply chain and inventory management, healthcare, cloud storage and computing data centers, and other similar environments, to name a few. As a result of virtualized thread sharing, program instructions may be deployed and executed utilizing multiple peers, rather than just a single device (i.e., a software application may be virtualized outside of a physical and single device).

As can be appreciated by those in the art, distributing deployment and execution capabilities across multiple peers provides, for faster and more efficient program execution, and vastly expands the overall execution capabilities of each peer in the network, particularly since a first peer may utilize the execution capabilities of a second peer to execute its program structure.

A system in accordance with the present invention makes possible this concept of sociable computing (i.e., computing between and amongst a "social network of peers") by implementing a sociable computing construct to realize and achieve the sharing of virtualized threads of control and execution. This sharing may include (without limit) the sharing of program instructions and derivative structures (e.g., aggregates and/or composites of shared threads of control and execution, data, meta-data, other structures, etc.). The sociable computing construct referenced above may be referred to as a program structure (defined below) comprised of one or more program instructions (defined below); and more particularly, as a "control structure" or "control structures." These control structures are special forms of program structures that may comprise one or more program instructions (and/or control data) for controlling the manner in which at least a portion of the structure's other program instructions are initiated and/or executed. In addition, the control structure may include one or more program instructions for controlling the initiation and/or manner of execution of actual compiled code. As with other programs or program structures (discussed below), the control structure of the present invention may comprise one or more program instructions that themselves comprise one or more additional program structures (i.e., a nesting property). In addition, control structures possess all other features and capabilities attributable to program structures, some of which are further detailed below.

Sociable computing in accordance with the present invention may be achieved through the transmission of, and the acting upon, control structures, either in part or in total, by multiple peers across any number of networks. In this respect, a control structure may be analogous to a conversation in a human context. For example, a conversation held between two or more people may bring about a change of state in the mind of the listener(s) as information flows within the conversation from one person to the other(s). This ad-hoc conversation, in moving from one person to other(s), can change its context and content by taking on the combined contributions of the listener(s) participating in the conversation, thereby resulting in a collaborative composition.

As noted above, control structures are able to control and/or affect behavior (i.e., the actions performed by peers in conjunction with their environments) besides that of just computing, for example taking on the actions of a deterministic system (e.g., given a particular stimulus, a system will have a specification as to which process to use, and will always respond with the same response) or that of a non-deterministic system (e.g., given a particular stimulus, there are multiple ways that a system can affect the processing of said stimulus, without specification as to which process will be used and it, will always respond with a result, albeit not the same result). By way of clarification, conventional systems and methods are deterministic systems because compiled machine instructions and/or byte-code instructions always run/execute in the same manner as a result of being compiled in the first place. Control structures, on the other hand, are capable of having their program instructions modified, added to, deleted from, or completely rewritten in response to and in conjunction with its sociable computing environment precisely because such program instructions are not compiled code.

Furthermore, in accordance with the present invention, control structures are able to interoperate with each other and also act independently from each other, leveraging the novel and unique capability of a control structure to function in a non-deterministic manner. Similarly, aspects of control structures are able to control singular and/or collective execution objectives depending on their contexts, once again leveraging the novel and unique capability of a control structure and/or a collection of control structures to operate in non-deterministic system.

In yet another aspect of the present invention, aggregates of control structures (i.e., a collection of control structures), and/or composites of control structures (i.e., a new control structure that is made from several different control structures), can themselves be considered control structures, either created a priori or a posteriori as the result of interacting in a social peer environment. In an exemplary embodiment, an aggregate control structure may include control data relating to a particular piece of music, for use in initiating a search for a potential audience of that certain music, and/or to track where that music, has been played and how often. In another exemplary example, a composite control structure may include control data relating to a venue, for use in determining whether that venue can support a particular band, and for initiating a hosting event at that venue.

As will be appreciated by those skilled in the art, changing a software application posteriori or postproduction is not currently possible due to the complexity of altering an a priori program code that has been compiled down into machine code (e.g., a mobile phone application written in C++ that is compiled into an Intel® dual-core, machine code) or interpreted byte-code (e.g., a mobile phone application written in Java® that is compiled down into Delvik® byte-code). A control structure, in sharp contrast, is able to change itself posteriori or post-production as needed. Further, in the context of the present invention, a control structure can also manifest itself as a state of execution or a state of data (e.g., an execution state that migrates from one peer to another, or has been captured as data for later replay) or both, depending on context, which is currently not possible with conventional software applications.

The ability of the present invention to virtualize program instructions and threads of control and/or execution via control structures enables users to achieve execution objectives using multiple peers by migrating entire program structures (or portions thereof) to those peer(s) that are best capable of acting upon the same, as opposed to requiring the full and complete execution of such objectives to occur on a single device on which particular software application(s) physically reside.

In another aspect of the present invention, control structures are able to utilize the Internet as a virtual multi-core microprocessor architecture. By way of analogy, in the same way as humans across a social network may share knowledge and information amongst each other through conversation to achieve some objective, where the conversation moves among the social network going from one person to the next until the objective is achieved, the present invention seeks to leverage the same type of information flow and action, but in a computing-based context. In the human context, conversations are often modified, parsed, augmented, etc. in order to achieve the human objective. Similarly, the present invention may modify and parse threads of control and execution across sociable peers and/or networks to achieve a computational objective.

In order to achieve sociable computing, the present invention enables peers (including those that comprise different hardware platforms, operating systems, software, configurations, etc.) to seamlessly communicate between and amongst each other, and to share in the execution of program structures. This ability, in part, is achievable by the ability of the present invention to migrate active threads of control and/or threads of execution amongst any number of network peers across any number of networks. As will be appreciated by those of skill in the art, existing networks and/or computing devices do not have the ability to migrate and/or share active threads of control or threads of execution. As a result, existing networks/peers are incapable of leveraging peers and/or networks in the way that the present invention does.

As used herein, the terms "program" or "program structure" are not intended to refer to conventional software applications, which consist of compiled, computer-executable code. Instead, a program or program structure (and by extension, a control structure) is intended to represent a proprietary structure of execution instructions that may themselves initiate the execution of code (e.g., software applications) that is hosted by a particular network peer. In addition, these program instructions may be used to affect how code or other instructions are executed, and they may even be used to initiate the creation or deletion of other program instructions, to write or delete control data, and/or to initiate the insertion of one or more program instructions into a program structure before, during, or after the program structure has begun execution. In the context of the present invention, a portion of a priori and/or a-posteriori program instructions and pertinent data may be combined to form a control structure. As will be understood by those of skill in the art; a program structure (or set of program instructions) in accordance with the present invention is one level removed (i.e., higher) from that of compiled, computer-executable code (e.g., machine code instructions or interpreted byte-code instructions). As a result, the program instructions of the present invention (and as a result, control structures) may be transferred amongst peers without the possibility of transferring viruses, they may be inserted or removed from a program structure after execution of the program structure has commenced, and they may initiate the execution of computer-executable code, as noted above. In addition, program instructions may be paused for any length of time and restarted, and executed across any number of network peers.

Notably, a program instruction may itself comprise one or more program structures. To illustrate, an example "program" of the present invention may include a sequence of instructions, wherein a first instruction may require a software application such as Flickr™ to execute, a second instruction may require a software application such as iTunes™ to execute, a third instruction may require an instant message application to execute, a forth instruction may comprise an entirely new program structure, and so on. As will be discussed further below, this "program" or set of instructions does not necessarily have to be carried-out by a single network device. In other words, the network device that initiates such a program need not have the capability of executing all of the various software applications called by the program (i.e., the network device need not host all the code called upon by the instructions to execute). Instead, the initiating device may leverage the capabilities of one or more of its network devices (and even on neighboring networks) to fulfill those instructions that it cannot carryout on its own.

Unlike, typical distributed application programs, which simply replicate and/or transfer program applications (i.e., store and execute in its entirety) amongst multiple network devices, and which require a central controller/server to distribute/control execution of the program applications, the present invention provides for the execution of a single proprietary program structure in "pieces" or in "variants" (based on personalization and customization criteria) across various network devices without requiring a central controller or server to orchestrate the overall execution of the program structure, and without having to transfer program application (i.e., code) between devices. In other words, rather than storing the same application in multiple devices and executing that application multiple times as determined by a central controller/server, and rather than transferring a program application to multiple devices, the present invention provides for a proprietary program structure whereby each independent program instruction is executed once by a network device that hosts the appropriate code for carrying out said instruction, and whereby multiple network devices may be used to fulfill the various instructions without the need for a central controller or server, and without the need to transfer, program applications. In this manner, the combined execution of all program instructions (by one or more peers in the network) will result in the complete execution of the program structure as a result of leveraging the capabilities of multiple network devices.

As a point of reference, conventional program replication may be found in today's instant messaging (IM) applications, distributed file sharing applications, traditional client-server applications such as web-servers, web-applications, email severs, back-office application servers, and the like.

It is important to note that unlike conventional systems, the sociable computing functionality of the present invention may reside across one or more networks (wired and/or wireless) of communication devices (configured or ad-hoc), rather than on any one specific physical device itself. For example, in a conventional system, a web-portal is typically resident to a single server instance, executing within a thread of control within the said instance. Contrarily, in one aspect of the present invention, for example, the thread of control may be distributed and shared across a plurality of computing devices of different types, which together comprise and form the computing social network.

By means of illustration, an exemplary "program" of the present invention may comprise a collection of program structures and/or instructions to provide an interactive and social music, video, and entertainment (collectively, "music") experience to a user using control structures. For purposes of this illustration, sociable network peers may comprise any device that is connected to ad-hoc and configured networks, and configured to host, process and execute music, video, and entertainment-related control structures. As further discussed below, such peers may include (without limit) car stereos, mobile communication devices, point-of-sale terminals, venue devices, banking systems, etc.

At the beginning of the present illustration, a control structure may be running on a user's peer-enabled smart phone. Upon some input by the user, the control structure is able migrate to the user's peer-enabled alarm clock, which upon receiving the control structure (or portion thereof) from the peer-enabled phone, injects a series of program instructions into the control structure to allow the control structure to migrate back to the user's smart phone at some future time. Notably, since the program instructions of the control structure can execute on both devices, the control structure is able to adapt (e.g., by creating and initiating new program instructions) to the particular requirements and characteristics of each device (e.g., device platform, operating system, etc.).

At a designated time, the control structure that is now running on the peer-enabled alarm clock causes the alarm clock to play music to wake up the user. Notably, the music being played was "found" by the control structure while the user was sleeping. This was accomplished as a result of the control structure being able to initiate the execution of its own instructions and to create new instructions to achieve the objective of finding new music for the user. First, by recognizing the user's music interests (e.g., via a musical genre/style profile inherent to the user's smart phone or alarm clock), the control structure is able initiate and/or control a search for artists and venues whose genre/style profiles match that of the user's, according to some set of constraints and heuristics. Second, as the control structure is. executing on the peer-enabled alarm clock, it is able to create a new control structure (e.g., program structure and instructions) to initiate a search for content that matches the user's musical interest. The search control structure may then be migrated to one or more peers across one or more networks seeking music, artists and venues for which the user's genre/style profile match, and upon successful discoveries, collect the music to be returned to the user's peer-enabled alarm clock, which can then be played to wake up the user in the morning. The ability to dynamically create a new control structure from a parent control structure and to then separate it from the parent control structure to find matches to the user's interest across a social network of peers is novel and unique with respect to conventional systems and methods.

In this particular example, the control structure (e.g., the parent control structure) playing music on the peer-enabled alarm clock comprises a composite data element (e.g., a child control structure which is data instead of execution instructions) which represents a template of a program structure and instructions that when modified according to the interest of the user, creates a control structure capable of being processed (e.g., transitioning a control structure seen as data into a control structure capable of being executed) which the peer-enabled alarm clock can broadcast across and within its peer network to find other peers (i.e., peers which host control structures that may represent a song or a band's discography, or a venue which has a set list available for public listening) capable of processing and responding to the control structure.

On upon receiving a search control structure, a peer can process it, ignore it, or pass it on to other peers according to the capabilities and/or properties of said receiving peer. For those peers that process the control structure, the control structure can collect the music from the artist or the band or the venue that the processing peers wish to share with the user, and in the act of sharing, they can composite with the control structure to form newly created control structures that are capable of enforcing a constraint, where one such constraint may include a digital rights management constraint or a time to lease feature; and of collecting information and data utilized for analytics, such as when the music was last accessed, how many times it has been shared, etc. As the control structure "knows" its origin, and from which parent it was derived, it is capable of translocation or migrating across the network to return to the alarm clock peer, where it can insert new instructions into the parent control structure, thereby giving the parent control structure new program instructions to play the new music discovered and collected from other peers (e.g., the insertion of program structure and instructions into an already executing sequence of program structure and instructions). Concurrently, the child control structure can inject a new program structure and instructions into the parent control structure, instructing it to populate a music/video/ entertainment, etc. repository with the properly annotated digital rights management for the music collected, or a lease time for when the music converts from listen-for-free to buy-to-listen, to name a few extensions. Once the control structure has completed it processing, it can invoke a program instruction which converts itself back into a data instance, which the originating control structure can later reuse in future search contexts.

Continuing with the present illustration, as the user awakens, he initiates an action (either through his smart phone or the alarm clock) to migrate the control structure back to the smart phone. The user then leaves his home and gets in a car with a peer-enabled stereo system connected to the Internet, and again causes the control structure to migrate, this time to the peer-enabled car stereo to play a "mashup" (i.e., a combination and/or modification of existing entertainment works) from the music collected for the user from other peers. In contrast to conventional systems and methods, which requires applications and content to be replicated for each device on which a user desires to experience the music, video, or other entertainment content, the present invention, through control structures, avoids this replication by migrating from one peer (i.e., the peer-enabled alarm clock) to another peer (i.e., the peer-enabled car stereo).

While traveling in the car, the user picks up his friends, each of which are in possession of peer-enabled mobile phones. The user's control structure, which is processing on the peer-enabled car stereo, receives a notification control structure indicating that friends of the user are in proximity and are able and willing to share their music notes. The music related control structure accesses a saved search control structure, modifies the program instructions to reflect a local proximity search, and then by processing it, the search control structure migrates from the peer-enabled car stereo to one or more of the friends' peer-enabled mobile phones to socialize and compare music notes with the control structures hosted on the peer-enabled mobile phones. The friends' music related control structures could behave in a similar fashion, thereby seeking each other out for music related artifacts.

The peer-enabled mobile phones of the present illustration are able to migrate control structures amongst each other and share music and information, which enable each mobile phone (via program structures and instructions on each phone) to: 1) 'recognize' each other, and 2) initiate specific behaviors such as comparing music profiles, and 3) migrate their respective control structures between and amongst recognized peers. Once these composite control structures reach another peer (e.g., mobile phone), the receiving peer(s) (by processing the control structures) are able to ascertain what features they have in common, what is new and different, and return those results back to the source peer(s) via control structures that migrate, thereby creating a closed loop feedback mechanism. In doing so, these control structures have enabled the peers to become social and perform an activity that normally requires manual intervention and interaction. In this illustrative scenario, control structures are providing both data and functionality. Furthermore, by finding matches (e.g., between a preferred genre of a user's musical profile and the genre of a band, or of the user's friends, or of a particular night club, etc.) between a set of control structures, new program structures and instructions may be written into the existing control structures for post processing in the future.

Continuing further with the present illustration, the user and friends decide to stop by a bar before heading to a concert because the user's peer-enabled car stereo (i.e., the control structure executing on the car stereo has actively searched for similar venues in the proximity of the user that matches the characteristics and profile of the concert they are going to attend) retrieves information suggesting that there is a band playing nearby that matches the user's music profile. As the user approaches the bar, everyone's music related control structure uses geo-location to migrate from their respective peer-enabled mobile devices and the peer-enabled car stereo to the bar's peer-enabled point-of-sale terminal to pre-order and pay for drinks, and to pay a cover charge, both of which will are automatically charged to the user and friends. Simultaneous with the migration of the control structures from the users' mobile devices to the peer point-of-sale terminal, data elements particular to each user are attached to each control structure and migrated as well. These data elements are then transformed by the peer-enabled point-of-sale terminal into executable control structures that initiate payment authorization from each of the users' respective banks. Upon receiving a confirmation from the banks, the point-of-sale terminal is able to migrate a control structure back to each user to notify them that payment has been accepted and to provide an authorization code to each user (e.g., which could be itself a control structure as data).

After receiving their respective authorization codes, the group proceeds to the bouncer at the bar, each showing their respective peer-enabled devices and authorization codes to the bouncer. Notably, before reaching the bouncer, the point-of-sale terminal had already migrated a set of instructions (e.g., including authorization codes) to the bouncer's peer-enabled device via a control structure to inform the bouncer that the user and his friends have already paid. This migration may have been initiated immediately upon the users' payment, or as the users' mobile devices approach (i.e., come into a predetermined physical proximity) the bounder's device. In any event, once the bouncer confirms the group has paid, he allows them to enter the bar.

Once inside, the group's control structures that have migrated and communicated (i.e., "socialized") with other peers in the bar are able to confirm that they have pre-paid for the drinks, which are waiting for them. This scenario of buying via the control structure can be applied to merchandise in general, and in fact to any good and service available for purchase.

As noted above, the peers of this illustrative example utilize control structures to recognize and discover other peers with similar interests and capabilities. In addition, the control structures of this example include instructions for initiating the purchase of items such as entry tickets and drinks at the bar. This may be achieved, for example, via control structures comprised of an aggregate of sub-component control structures: first, a search and discovery control structure (e.g., configured to insert new program structures and instructions into an already processing program structure and/or instructions) may "find" a bar and drink menu according to user profiles; and second, a transactional control structure may be configured to initiate certain purchases on behalf of the user and friends (e.g., also via the insertion of new program structures and instructions into a newly created control structure that migrates to the bank and/or payment center to process the purchase). Each of these control structures comprises specialized program instructions that are personal to the respective users, although the general structure or the control structures may be similar. The ability to rewrite the program instructions of a control structure allows aggregate and composite control structures to serve multiple individuals while leveraging from a common template of program structure and/or instructions.

Completing the present illustrative example, the group leaves the bar and finally arrives at the concert. At the concert, the users' mobile devices (which may comprise motion and/or sound sensors) utilize control structure instructions to automatically compare the music being played with profile data of the respective users. Based on this comparison, one or more of the control structures determines that the music being played matches its user's profile and is therefore worth collecting. To do so, the control structure creates and migrates a specialized venue-collecting control structure (e.g., a series of program instructions capable of interacting with program instructions on different peers to achieve a common goal as a result of executing the program instructions) to the venue's peer-enabled computer so that it can collect music. Notably, control structures migrating from peers that are not physically present at the concert (as far away as other countries) may also collect music for their users from the concert by migrating directly to the venue's computer.

In the foregoing illustrative example, peers are able to collaborate and share information and content with each other, and they achieve this through the collective use of control structures as well as the component pieces of program structure and/or instructions, which may be comprised of multi-layered aggregates and/or composites of data control structures as well as process capable control structures which can be modified, added, and/or deleted in order to achieve the collective goal. It is this ability to migrate control structures amongst peers that gives peers in a peer network the capability to socialize, as described in this disclosure.

The present invention is illustrated with exemplary embodiments, features and/or otherwise, and it is not limited thereto. Rather, the foregoing description should be construed broadly to include other variants and embodiments of the invention, which may be made by those skilled in the art without departing from the scope and range of equivalents of the invention.

In an exemplary embodiment, the present invention may simply be referred to as a Business Internet Operating System, or "BIOS". It should be understood, however, that this term is not intended to limit the present invention in any way. It is merely intended to provide a shorthand way of identifying one aspect of the present invention.

Thus, in an exemplary BIOS enabled network (which includes one or more BIOS enabled network devices, and which may include one or more smaller BIOS networks), each device in the networks) will be configured with a 'core' set of instructions that are common to all devices in that network. In addition, each network device may have its own individual instructions representing its additional functional capabilities and/or its ability to execute one or more software applications above and beyond those that are common to the network. Thus, a BIOS program may consist of a sequence of instructions in a "semantic" form, which comprise two categories: (1) the BIOS "core" instructions, which include those program instructions which may be executed on any BIOS peer; and (2) the BIOS "extensions", which consist of a semantic interface which calls upon the unique resources or computing capabilities of the various BIOS peers. For purposes of this disclosure, the term "semantic" refers to describing or presenting instructions, software, code, etc. in such a way that any recipient of the same is aware of how to interpret said instructions, software, code, etc., regardless of whether the instructions, etc. was intended to be 'compatible' with the recipient.

To execute a BIOS program (i.e., a set of instructions, including core and extensions, that comprise a subset of all instructions available), a first network device or host "peer" may begin executing the instructions until it gets to an instruction it is unable to execute, or otherwise determines that it should not execute (e.g., the program itself may include an instruction that explicitly instructs the host peer to refrain from executing certain instructions, even if said host peer has the ability to do so). As used herein, the term "peer" or "network peer" shall refer to any network device (as that term has been defined above) that has been networked and/or configured to communicate with other peers in a computing social network that has been configured in accordance with the present invention.

Thus, once a network peer reaches an instruction it is unable to execute, or otherwise determines that one or more other peer(s) should execute one or more program instructions, that network peer may opt to send or migrate one or more of the program instructions, together with any requisite data (including control data), to one or more other network peer(s) that are capable of executing said instruction(s). Optionally, the network peer may bundle up the entire program (including instructions that have already been executed), and migrate the program, together with any requisite data, to one or more peers for continued execution. In either case, the program will continue to execute/migrate in this manner amongst the network peers until the ultimate objective(s) of the BIOS program are achieved. Notably, reaching the ultimate objective(s) of the BIOS program may or may not require all program instructions to be executed. Execution of a BIOS program in this manner may be considered a form of "distributed execution" insofar as different instructions or portions of the BIOS program are executed by different BIOS enabled devices across the BIOS network using various types and configurations of network communications. Thus, the BIOS communication network itself may function as a microprocessor backplane for the BIOS platform, with each BIOS peer (or device) in the network comprising its own native operating system and individual program execution capabilities.

Notably, this form of distributed execution does not require a central controller or server to determine or dictate which peers execute which program portions or instructions. Instead, the peers or program instructions determine which (if any) instructions are to be migrated, and which peer(s) are to receive the migrated instruction(s). For example, as noted above, a BIOS program itself may include instructions requiring the host peer (i.e., the peer on which the program is currently residing) to migrate one or more, of the instructions to one or more other peers for execution. In such a scenario, the BIOS program controls the movement or distribution of the BIOS program. Alternatively, the host peer may include, as part of its core instructions, the ability to recognize instructions, which it is not configured to execute. Optionally, the instructions themselves may include code that is indicative of the capabilities required for their execution. In such cases, the host peer may include inherent core instructions to query for another peer(s) in the network capable of continuing execution of the program instructions, and to migrate the program instruction(s) to said other peer(s) for execution.

The above illustration is one example of how the present invention is able to create peer-to-peer computing infrastructures for enabling, shared program execution power and ability from among any number of network devices within the same or across different networks, including both server and serverless network topologies.

As noted above, the present invention utilizes a particular program structure to enable distributed execution of instructions across multiple devices of a peer-to-peer computing social network, and/or across multiple networks. To create this program structure, the present invention may make use of a proprietary programming language, hereinafter referred to as "iDNA" (Internet DNA), which enables and initiates the execution of the instructions across any number of devices or networks, and over any period of time (i.e., execution may be paused, cached, delayed, etc. for any period of time, and then resumed). Further, iDNA is such that it needs not be aware of which, how many, or the location of the network devices that will ultimately execute the instructions.

As with other novel terms used throughout this disclosure, the term "iDNA" is not intended to be limiting, but rather provides a shorthand way to refer to one particular programming language that may be utilized to implement the distributed execution concepts of the present invention. It is important to note that iDNA and the various other novel concepts discussed herein are all mutually exclusive. In other words, distributed execution, for example, may be implemented independent of iDNA, and vice versa.

By way of background, the term 'iDNA' derives from the concept of creating a programming language that encompasses many of the characteristics of actual DNA. For example, just as the mechanism of molecular genetics/biology are able to insert, re-write, and/or extract certain sections of DNA from within DNA strands, network peers may insert, re-write, and/or extract certain portions of iDNA code and/or instructions from a set of program instructions in order to accomplish (i.e., complete) the entire program instruction set. For example, a classical view of DNA is composed of regions which encode specific sequences required for protein synthesis (exons), as well as regions which are not translated into proteins (introns) but which may be involved in controlling the expression of said protein encoding regions (exons). Before protein synthesis begins, the non-coding DNA regions (introns) are removed in a process called intron splicing. After said processing, the resultant messenger mRNA, which encodes the protein specified by the gene in the DNA sequence, consists only of exons. A similar approach is taken via the architecture of iDNA, insofar as iDNA contains instructions, which actually execute software artifacts on a peer, as well as instructions, which manipulate the execution of said instructions. The instructions, which execute software artifacts on the peer, are not unlike the exons of DNA. Furthermore, the semantic and structural aspects of iDNA are not unlike the introns of DNA, which control the expression of protein encoding genes. It is this type of architecture, which leads to the robust results of said invention.

iDNA uses semantic structures (e.g., W3C standards and extensions to the baseline RDF specification) to encapsulate existing software applications, original embedded algorithms/code, library extensions, and/or any piece of code in a manner that enables network peers to recognize the encapsulated code as an instruction, and to determine whether or not it is capable of executing said instruction. As a result, these instructions (which call upon any number of different software applications) may be discoverable, capable of being reasoned about, and ultimately executed by any number of peers in the network or from neighboring networks.

Encapsulating software applications, as described above, refers to the process of appending certain proprietary code to existing software code. This proprietary code may include, and is not limited to, additional code which calls software artifacts, as well as code which assists in discovering said software artifacts, as well as semantic representation which articulate the specifics of said software artifacts. As a result, BIOS configured devices will be able to recognize and understand what to do with the encapsulated instruction (e.g., execute or push on to next device). Encapsulating software applications in this manner allows for large-scale threads of both execution and control (e.g., even Internet scale), which can be recognized and followed by any BIOS enabled computing device. As a result, users, programmers, and BIOS-type networks are able to bundle up various executable instructions in semantic form (as opposed to machine language), together with any requisite data and distribute the execution of the bundle across multiple devices (and/or networks) that are reachable via a network infrastructure. In effect, this invention may use web standards to perform fetch and execution cycles of micro and macro scale instructions and data at the addresses represented by the computing devices themselves. In the case of the Internet, this approach brings the fetch and execution cycle to the surface of the Internet, thereby achieving a virtual multi-core microprocessor architecture on a network/Internet scale.

Another aspect of iDNA is its ability to be written and/or re-written on-the-fly as the result of knowing the semantics of both common core instructions and the more unique and breadth oriented extension instructions. Specifically, starting out with an objective, specified as: a) "here is what I have" (which may include certain initial conditions characterized via artifacts, data, resources, processes, etc., and as b) "here is what I want" (which may include certain desired final conditions characterized via artifacts, data, resources, processes, transformations, new strands of iDNA, etc.), a series of graphs can be generated to reflect one or more solutions/paths for reaching said objective in a manner that considers both the initial conditions of the objective and its final conditions.

The "haves" and the "wants" are specified using semantic specifications just as the iDNA instructions are themselves specified with semantics. Thus, a graph depicting a solution/path for reaching a particular objective may comprise a series of semantically annotated instructions where the "haves" comprise the start-node of said graph, the "wants" comprise the end-node of said graph, and one or more semantically annotated instructions comprise intermediate nodes between the start and end nodes. Since the use of semantics is uniform across all nodes in a computer social network, the present invention can pose interesting questions such as, for example: Is there a trajectory from the start-node through any given number of intermediate-nodes which concludes with a complete path to the end-node? If there is (and there may be many), then that trajectory, when condensed to its symbolic form, may be considered akin to a strand of iDNA code which results in achieving said objective.

Likewise, if no trajectory exists, then the configured computing social network may not be equipped to accommodate the type of distributed computing required by said objective. This knowledge about the completeness of the computing graph aids in the runtime configuration and management of the computing social network. Complete traversal can be fully specified, which yields an a priori strand of iDNA, or it can be partial, with the details of particular sections of intermediate-nodes being determined at runtime while the trajectory is being traversed; this approach yields an a posteriori strand of iDNA.

Referring now to FIG. 1, an exemplary BIOS network 100 configured in accordance with the present invention. Included in this exemplary network 100 are a database server 101, an application server 102, an email server 103, an Internet application 104, a mobile device 105, a desktop device 106, a legacy server 107, a process server 108, and a wireless server (e.g., an SMS server) 109. The quantity and type of devices shown in this exemplary network are not intended to be limiting. To the contrary, any number or type of devices (or peers) may comprise a social network in accordance with the present invention, and multiple social networks may be connected through common devices (or peers) serving as a 'bridge' between any number of adjacent social networks. As will be appreciated by those in the art, however, the robustness of the network increases proportionally as the number and/or types of devices present in the network is increased.

Unlike conventional networks, the exemplary BIOS network 100 is able to utilize its various resources 101-109 (i.e., various network peers) to execute a particular set of instructions 110 socially. In other words, each network peer 101-109 has access to and is able to leverage the functional capabilities of the entire group (101-109). Thus, any one peer can request a particular instruction; even if that peer, is itself incapable of executing said instruction. An illustrative example of this concept is described below.

Suppose a user desires some information or has some sort of request. Using his mobile device 105, the user may generate and send a text message to the network 100. The text message may include any sort of reminder, a question, a request, a command, etc. For example, the text message may read: "remind me to pick up shampoo" or "remind me to pick up my dry cleaning"; "notify me when my friends are nearby and share a similar interest"; "where is the nearest Starbucks™ to me"; "find points of interest from my local geo-path in this city"; "show me stores here which participate in my digital loyalty program"; "recommend a good Italian restaurant here in New York City that is within 5 blocks of my current location"; etc.

For purposes of this illustration, it is assumed that the user desires to locate a Starbucks™ coffee shop that is nearest to his current location, and as a result, generates and transmits a text message: "where is the nearest Starbucks™ to me" to the network 100. In order to actually respond to the request, several determinations (each requiring different hardware/software capability) must be made. First, the mobile device 105 needs to know its geo-location. If the mobile device 105 is not equipped with or does not support Global Positioning (GPS) natively, it must defer the determination of its location to some other provider (i.e., another peer in the network 100). Secondly, a parser and/or some recognition software/hardware is necessary to interpret the text message to understand what exactly the user is requesting (i.e., the user's intent). Once the user's intent or objective has been ascertained, the user's geo-location must be associated with the business entity of "Starbucks™" and quantified with the user's intent to find the nearest Starbucks™. Fourth, the association and user's intent must be communicated to a service, which can perform two-dimensional location based map services. Required are the geographical Starbucks™ map locations and/or the means whereby that information can be acquired. Fifth, once a proximity map (showing the user's location and the nearest Starbucks™) is generated, a "best route" for guiding the user from his current location to the nearest Starbucks™ must be determined, thus routing capabilities are required. That path can be returned as a text message of directions, or as a path overlaid on a map rendered through a mobile web browser on the mobile device 105, for example.

For purposes of an additional illustration, it is assumed that the user desires to be offered similar shopping or 1:1 marketing campaign experiences and/or loyalty program offers of a local context while in a remote location. In a local context, a user's ability to opt-in to local merchants 1:1 marketing campaigns establishes interest with location. In a local context, a user's geo-path (defined as a collection of spatial and temporal related geo-position samples with associated meta-data) is accumulated over a period of time, for which repeated interactions with merchants and services/solutions denote pattern(s) of increased interest and/or participation. These learned behavioral patterns can be applied even when the user is in a remote location, such that the user of said services operating on a network configured according to the present invention can benefit from services and offerings similar to those offered in the user's local context, even when the user is in a remote context (e.g., when the user is traveling). This allows global access to loyalty and brand programs that span local and remote contexts based on behavior patterns of users making use of their mobile devices as bookmarks into their behavioral interests, regardless of location.

Referring again to network 100, the various network devices 101-109 may be utilized collectively to execute the user's request. For example, database servers and/or services 101 may be accessed to retrieve store locations of various Starbucks™; application servers 102 may be utilized for its GPS triangulation capabilities; email servers 103 may be utilized for communicating information; Internet applications 104 may be used to overlay a route (from user's current location to closes Starbucks™) onto a web browser illustrating for the user how to arrive at the Starbucks™; mobile device (and application) 105 is used as a "remote control" to initiate the text message and transmit it to the network 100; desktop applications 106 comprising an online proxy may be utilized to monitor and, log what its owner is doing while in a mobile real-life context; legacy servers 107 may comprise standalone applications or command line tools which may be accessed for natural language processing and/or recognition; Process and/or Workflow servers 108 may be utilized to orchestrate the flow of resources to obtain a final product—which in the example given is satisfying the user's request to find the nearest Starbucks™; SMS and other types of wireless access points 109, which connect the mobile world with the online world in contexts may be utilized to request information via simple text messaging which relies on the SMS protocols.

Ultimately, the user's simple text message is transformed into a self-realized strand of executing instructions 110 which executes across the various network devices 101-109, as discussed above. The strand 110 includes pieces of executing instructions which when performed on the respective computing devices 101-109, results in the goal being obtained for that particular segment of the strand of executing instructions. In total, the completed path of execution may (as in the foregoing example) span multiple devices. That said, the orchestration of said execution is controlled by the strand of instructions 110 itself, and is not relegated to the control of the devices 101-109. In other words, the devices 101-109 do not control how the instructions 110 are executed, they merely provide the environment whereby the each instruction in the strand may be executed.

"Stateful" and "stateless" bifurcations within the architecture described herein are novel with respect to existing architectures. The term "stateful" is defined as the concepts and mechanisms utilized to track a set of disjoint entities as if belonging to the same group, as opposed to tracking them as separate entities in isolation. As a group, there is a concept of "whole knowledge" (i.e., knowledge which is accessible, modified and/or created by the group), which spans the collective of entities, implying that one entity may produce information that another entity may reference but at a much later date than generated. Any entity, which is a part of the group, has access to the "whole knowledge" of said group. This type of persistent knowledge is possible as state is maintained for and across the group of said entities.

Conversely, the term "stateless" is defined as the concepts and mechanisms utilized to track a set of disjoint entities in isolation, independent and mutual exclusive of each other. As a result, there is a lack of global and shared knowledge with respect to the other entities. This lack of global and shared knowledge allows for simpler solutions to distributed computing at large.

As noted above, one of the novel aspects disclosed herein includes the ability to distribute a thread of control and/or a thread of execution. By definition, the act of execution is the result of state over a period of time involved in the act of execution. If the act of execution that is occurring in a host peer is interrupted prior to its completion, several aspects are known: 1) the extent of execution to up until the interruption; 2) the amount of execution remaining; and 3) the state of the execution environment. These three aspects, of which there may be additional aspects, may be referred to as 'stateful' representations of different aspects required for said execution. As an option, these stateful representations may be stored in memory (or to a persistent storage representation such as a database or a serialized file, for example), such that the act of execution may be continued at a later date. Alternatively, a different peer may continue execution. In order to continue said execution on the different peer, these stateful representations may be conveyed from the host peer to a second peer, as which point the second peer may continue execution as if it were the original host peer. This capability is due to the benefit of a 'stateful' strand of iDNA.

It is important to note that concurrent with maintaining stateful representations of an execution session, the executing peer itself is 'stateless', as it has no internal concept of state other than what it is given by the iDNA strand, and it only knows of that state for the duration of the iDNA strand itself. Therefore, there is no context maintained from one iDNA strand to the execution of a different strand of iDNA. As a stateless peer, every iDNA strand is processed independently of any proceeding or succeeding strands of iDNA, and as a result, an asynchronous stream of iDNA strands are seen as mutual independent and exclusive of each other. Thus, the concept of 'statefulness' is relegated to the content of the iDNA strands themselves, and any relationship implied or explicitly exploited are the direct results of statefulness encapsulated within iDNA messages. It is through these methods and processes that distributed computing is made as simple and yet as robust as the actual DNA models of molecular genetics/biology.

As demonstrated by the above example, one of the novel aspects of the present invention is the ability to leverage disparate pieces of technology and/or network devices, which do not necessarily "know" how to communicate with each other, and combine them to seamlessly execute a user's commands/requests. Using various network devices and technology in this manner goes well beyond the conventional web applications, which are typically client-server centric, and well beyond the single computer application, which is device centric. Indeed, executing instructions requiring various technologies requires the ability to merge different computing resources in order to use them in ways not previously considered. The network 100 of FIG. 1 and the above illustrate this novel ability of combing multiple computing devices and resources, some of which are hardware specific, others software centric, and others comprising both.

In addition, the network 100 is able to utilize its various devices to 'learn' and store certain recurring request/behaviors. This way, the system is able to anticipate certain recurring requests, and/or proposition the user to confirm. For example, referring again to the Starbucks™ example discussed above, if a user habitually purchases coffee in the morning, the network 100 may 'learn' this behavior by either analyzing recurring instructions (such as "find the nearest coffee shop"), or by recognizing (via GPS and server applications of the network, for example) that the user frequents coffee shops. Once this behavior is 'learned', the network will be able to anticipate user commands and prompt the user, rather than waiting for the user to generate a command message. For example, if the user travels to a location that is beyond the user's 'home area', the network may be used to prompt the user and ask the user (via a text message, for example) whether the user desires to learn the location of a local coffee shop, as this would be consistent with previous behaviors and/or requests and/or purchases. Alternatively, the network may simply provide the location and directions to the nearest coffee shop, without waiting for the user to confirm, something the user can 'teach' the invention to 'learn'. Thus, what results is an integration of business social networks and human social networks, where the business networks behave in a manner that is similar to humans (e.g., by learning behavior and prompting users accordingly).

As noted above, program instructions of the present invention may fall into one of two categories: "core" and "extensions". The core instructions are those that are common to all peers of a computing social network (e.g., a BIOS network). In addition to having this core set of common iDNA instructions, each peer in the social network has its own individual instructions (i.e., "extensions") representing its ability to execute one or more additional instructions (e.g., software applications) above and beyond the core instructions that are common to all peers in the network. Since these "extensions" are encapsulated using the proprietary iDNA language, other peers can read and comprehend these extensions, even if they are themselves incapable of executing the same.

The second category of instructions, or "extensions", represent unique capabilities of any specific network peer, its functionality, its I/O data types and related requirements and constraints, as well as metrics for quality of service and other similar non-executable metrics (e.g., pre-flight verification, micro and macro cost analysis, dynamic semantic and/or functional routing table modifications, real time and optimized network topologies, etc.). The ability to recognize and ultimately utilize the individual "extensions" of each peer in the network extends the functional capabilities of each network peer. In other words, if one particular peer in a BIOS network desires to execute an instruction, but is itself incapable of executing that instruction, that peer may call upon another peer in the network with such capability to execute the instruction and return the results, or to simply continue the thread of control and/or execution. This way, each peer in the network is virtually equipped with functional abilities of the entire network. Furthermore, the particular peer may, via its non-executable metrics, control if, when, and how another peer executes the instruction, as these metrics represent constraints such as time to perform, cost to perform, a priority to perform, a location to perform, a quality to perform, a performance metric to perform, a software metric to perform, a reuse metric to perform, a router metric to perform, a connection metric to perform, a connectivity metric to perform, a networking metric to perform, a social metric to perform, a data analytic metric to perform, a data collection metric to perform, a user experience to perform, a quantitative metric to perform, a qualitative metric to perform, a location to perform, etc.

In a program comprising a set of core and extension instructions (e.g., BIOS program), the instructions are fetched and executed in order. Unlike conventional programs, however, one novel aspect of this invention is that the program can be self-modifying in response to the execution context. For example, in a conventional web-based application program, if an external RESTful™ application program interface (API) fails to execute, an exception is caught and the program fails to achieve its final goal. In a BIOS program, for example, when an instruction fails, the BIOS program is capable of re-writing its instruction base to find an alternative by which the goal of the overall program may be achieved, albeit perhaps via a different mechanism.

Therefore, when a BIOS peer is given a strand (a portion) or a variant piece of instructions (e.g., iDNA) for execution, it will execute all instructions until it reaches the program terminal, until it reaches an instruction requiring the peer to migrate one or more program instructions, or until it encounters an instruction it can not execute. When either of the later conditions is encountered, the host BIOS peer will query the computing social network for a peer capable of executing said instruction(s). In response to the query, the host peer receives data relating to the capabilities of the responding peers. This information is stored as a record and evaluated to determine if any of the responding peers is capable of continuing execution of the instruction(s). If a peer node capable of continuing execution is identified, the one or more instructions (up to the entire BIOS program), including state and any requisite context data, is migrated from the host peer to the peer(s) offering to continue the thread of control and execution. From the perspective of the BIOS program, execution continues without interruption. However, from the perspective of the executing peer network, the actual BIOS program itself traverses between BIOS peers in order to complete its execution goals.

Unlike conventional software programs, which are designed and written to execute on a single device until said execution is completed, the program structure of the present invention is wholly unique insofar as it enables the program to migrate outside of the physical device on which said software is executing and/or initiated.

In addition, it is important to note that the program structure of the present invention contains no code, and as a result, such a program will never download code to a network peer. Thus, unlike conventional program structures, the program structure of the present invention is anti-viral. In other words, it is incapable of carrying and/or infecting host software/hardware with viruses. Thus, transference of a program instruction or program structure (e.g., an iDNA strand, for example) does not result in code being downloaded into the host-computing environment. The innate benefit of the program structure of the present invention is that the software artifacts, which are required to be executed by the program structure already, reside on the host-computing environment. Therefore, execution may commence without the need to install anything for which the administrator of said host computing environment has not already verified, certified and approved for inclusion into said host computing environment. The program structure calls upon what is already present in the host-computing environment and therefore by definition, does not encode, download, install, or otherwise introduce a foreign software artifact in order to execute the instruction(s) of said program structure.

It is noted, however, that certain core instructions will initially have to be downloaded and installed on a network device to enable said device to join the network as a first class BIOS peer, for which the administrator of said host computing environment has already verified, certified and approved for inclusion into said host computing environment. Aside from the initial device set up, the novel program structure of the present invention simply provides semantic instructions, which explicitly define how to execute and act upon code that is already resident on the BIOS peer receiving the instruction(s). As a result, a BIOS program is incapable of infecting a BIOS peer, as no native code or script is ever downloaded into said BIOS peer. Each peer's particular extensions or execution capabilities are established independent of the rest of the network or peers, and not as a result of code downloaded from a distributed program. Collectively, a group of network peers comprise a set of core instructions that are common to all network peers, and certain instruction extensions, which are unique to the various network peers. As a result, the peer-to-peer network forms a computing social network, which provides the execution template on which a BIOS program traverses and executes according to its intent and design.

Another feature of the program structure of the present invention involves the handling of exceptions. In the case of a BIOS program, for example, if the program cannot continue because the network is unable to find a peer to execute the instruction in situ, then the entire BIOS program may be recorded for later playback, or later re-execution or other exception handling mechanisms that are available. This invention is unique as it maintains both state as well as stateless memory. Preservation of stateless memory allows a BIOS program, for example, to continue execution at a later stage as the entire sum of the execution machinery is preserved. To illustrate, if a current instruction (which faulted) of a BIOS program is nested within recursive conditional statements, within looping statements, within micro and macro strands of control and execution, the entire knowledge of execution context is preserved. In conventional software, to the contrary, when code fails and an exception is captured, the programmer/user has to determine what to do, and will cease execution until the programmer/user provides a further instruction (or in cases with software at large, the program crashes). Unlike the present invention, conventional software is incapable of capturing and saving the stateless memory of the microprocessor itself (e.g. the programmer can not snapshot the physical microprocessor's state and do something with it at the meta-level of control and execution). The present invention, in sharp contrast, is capable of preserving the execution machinery when a fault occurs, allowing the BIOS peer group the meta-level control for how to resolve and continue the BIOS program execution. This also implies that state from the perspective of the BIOS program is also preserved and migrated with the BIOS programs so that when it continues, it is as if the program were always executing where it now resides.

To further illustrate the novel concepts provided herein, a BIOS program execution path may be considered akin to an a posteriori schedule insofar as the start and end goals of an iDNA-encoded program according to the present invention are known a priori, while the actual path of execution traversal, however, may be completely unknown until execution actually begins. In other words, a BIOS program will identify and execute on the requisite BIOS peers as required to achieve the goals of the BIOS program, however, until the program actually starts to execute, the next step (or network peer) along the execution path may or may not be known ahead of time. This phenomenon may be caused by any number of factors, including (without limitation): the dynamic nature of a network (i.e., peers entering and exiting), the changing execution capabilities of peers (i.e., system administrators changing the services offered by a host environment), the volatility of network traffic/congestion (i.e., cell phones losing connection, etc.), the intrinsic nature of the network substrate on which BIOS programs execute, or any number of other factors.

One common reason for the unpredictability of the execution path is the dynamic nature of a network. Since the sociable computing techniques of the present invention are adaptable to work in any type of network environment or configuration (i.e., networks having any number of fixed and/or ad-hoc network topologies), it is not uncommon for different BIOS peers to continually come into and/or exit the network (e.g., RFID devices, mobile devices, etc.). As a result, the networks execution capabilities are constantly changing. Indeed, as new peers enter the computing social network with new extension(s), the execution capability of the social network may be expanded. Similarly, new peers may enter the network having extensions already existing in the network, thereby adding scale and robustness to the peer group, which could be helpful for managing load and demand (e.g., track and trace). In this regard, the present invention provides a network level virtual multi-core microprocessor (the computing social network) that can grow and scale according to business need and runtime, real-time constraints, and environmental conditions. In addition, the present invention provides the ability to scale and execute both at the instruction level and also at the meta-level where instructions themselves can be seen as an encapsulated instruction to be executed elsewhere within the peer group or to be post processed for fine tuning or performance evaluation (e.g., pattern detection/analysis, path detection/analysis, etc.), for example.

In another aspect of the present invention, the execution path(s) by which an iDNA encapsulated program may be executed (across multiple network devices) may be chosen ahead of time according to previously defined routing tables held resident in each network peer, or they may be suggested by the entire meta-level knowledge of the peer group during real-time query and discovery updates within the plurality of known peer-to-peer computing social networks. This results in a computing/execution environment, which is dynamic insofar as it adapts to reflect the constantly changing network topology, thereby providing preferred path(s) of execution.

In order to create a sociable computing program in accordance with the present invention (e.g., a BIOS program or a strand of iDNA), a software toolkit (e.g., "BIOS SDK") may be utilized to generate instruction wrappers for each new extension to be added to the program instruction core. To promote software reusability, this software toolkit may also be employed to facilitate the manual and/or automated generation of such programs from preexisting portions of program instructions (singular, micro or macro). For example, a programmer could use the BIOS SDK to query BIOS peers for the existence of a BIOS instruction meeting certain semantic requirements. Moreover, by providing a meta-level semantic description of the desired functionality of an entire BIOS program (a priori knowledge of input set of data and desired output set of results), a user and/or the peer group itself could invoke an automated network search across BIOS peers for potential candidate sequences of existing BIOS instructions (i.e., entire BIOS programs) that would satisfy the requirements of that meta-level semantic description.

As alluded to above, the present invention provides a novel approach to handling threads of execution and threads of control. Indeed, the present invention fundamentally changes how threading, not just parallel threads, but individual threads may split/merge and/or rewrite itself, depending on the capabilities of a current peer group (i.e., peer-to-peer network) as described above. Thread of control and thread of execution is itself a tangible state that can be manipulated.

Figure 2:
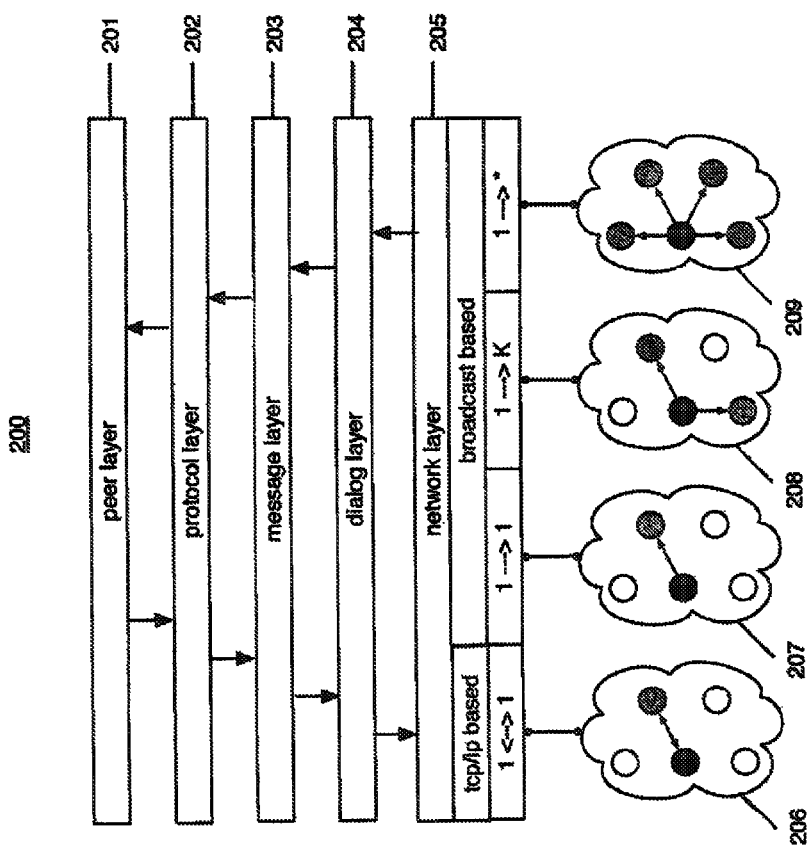
FIG. 2. shows an exemplary computing or network peer configured in accordance with the present invention.

Turning now to FIG. 2, an exemplary computing or network device 200 configured in accordance with the present invention is shown. The exemplary computing device 200 may include multiple layers, including, without limitation, a peer layer 201, a protocol layer 202, a message layer 203, a dialog layer 204, a network layer 205, and/or others. The exemplary device 200, once networked with other similar devices, may become a network peer of a computing social network configured in accordance with the present invention.

Beginning with the first layer of the network device 200, the peer layer 201 is where functionality that is unique to the device 200 (i.e., "extensions") is hosted. In other words, peer layer 201 hosts functionality/capabilities that differentiate one peer from other peers. As noted above, each peer in a peer group comprises a set of common or "core" instructions (or functional capabilities). These core instructions enable peers within the group to communicate with one another. By adding extensions (or additional functionalities), each peer extends the functional capabilities of the entire group, since each peer may call upon the functional capabilities of any other peer in the group, as demonstrated above. These additional capabilities or extensions (which go beyond the core instructions) are hosted in the peer layer 201. As described above, these extensions or extended functionality may take the form of any piece of software which can be semantically described (as that term has been defined above), and therefore executed across a collection of peers, including but not limited to software artifacts such as algorithms, libraries of compiled code or web services.

In the case where iDNA is being utilized, the peer layer 201 is wholly responsible for the interpretation and execution of iDNA program instructions. The peer layer 201 will execute all of the program instructions it is equipped to execute, and provide the results to the protocol layer 202.

Aside from receiving execution results from the peer layer 201, the protocol layer 202 host the peer's "core instructions", or functional capabilities that are common amongst all peers in a peer group. These common or core instructions enable peers to communicate, discover, query, etc. with each other. In the case where the peer layer 201 is incapable of executing an entire set of program instructions, the protocol layer 202 is responsible for taking the results and the unexecuted instructions from the peer layer 201 and passing or forwarding them onward as broadcasted peer dialog to one or more other peers, in the peer group.

The protocol layer 202 is also what enables network devices configured as device 200 to interact with one another socially, similar to the way humans interact socially. This layer 202 enables the peers in a peer group to be tied together via one or more specific types of interdependencies, such as peer group execution, administration, search and discovery, security and privacy heuristics, for example. Thus, as a result of its ability to communicate with other similarly configured devices, device 200 is able to form and engage in social network activities.

To illustrate, if network device 200 were a part of a computing social network and received a particular set of instructions, but was unable to complete all of the instructions, the protocol layer 202 would look to the device's 200 network peers to determine whether any of them were able to continue to execute the instructions. Once a suitable peer is identified, the instructions are bundled (and/or re-written via inserting, changing, or extracting code, for example) and sent to the peer for execution. When execution is completed (or continued), that peer may return the results to network device 200. This type of interaction is akin to how humans interact socially. Thus, such interaction between peers is considered 'social' activity.

To further illustrate, suppose peer 200 received a set of instructions, say "execute A, followed by B, then C", but upon execution of the instructions, peer 200 fails on B. Protocol layer 202 (in conjunction with the peer layer 201) may determine that a nearby peer, say peer X is capable (and willing) to execute B. Layer 202 then rewrites a portion of the original instruction set to include new codes to instruct peer layer 201 to zip up the original set of instructions, together with the new codes inserted by protocol layer 202, and send to peer X for continued execution. The new codes may also include instructions for peer X to execute B, rebundle the instruction set (with the execution results), and return to peer 200. Peer layer 201 will then execute the new instruction set (with code insertions) and protocol layer 202 will forward the bundle onto peer X for continued execution. Once executed, peer X returns the bundle back to peer 200, where C is executed.

It is important to note that the interactions between peers in a group are much different and more sophisticated than peers in a peer-to-peer network. Indeed, in a conventional peer-to-peer network, peers interact on a 1:1 basis (e.g., file sharing, music streaming, VoIP, etc.). Social peers, such as peer 200, for example, may interact on an n:m basis, such as by collectively executing a set of program instructions, as discussed above.

Below the protocol layer 202 is the message layer 203. The message layer 203 enables actual dialog between peer 200 and other peers to occur. The message layer 203 abstracts from the protocol layer 202 the details required to send/receive messages between peers within a peer group. The message layer 203 provides a uniform representation for dialog in a computing social context whereby peers can communicate among each other across bi-directional links, or whereby peers can 'tell' each other of specific events, which require only uni-directional links. The message layer 203 hides the specifics and details for constructing the proper message semantics from all upper layers, thereby exposing only the tell (uni-directional) or talk (bi-directional) dialog. Talking dialogues may include, but are not limited to "handshaking" messages between two peers used to create a symmetric encryption key, to dialog for moving content from one peer's memory to another peer's memory. Tell dialog may include, but is not limited to, a message from one peer to a group of peers to notify them that a new peer has entered the current social network instantiation as well as its unique semantic capabilities, and a simple login and logout sequence which lead to the creation or destruction of a talking channel.

The dialog layer 204 is where actual messages are made across physical network stack protocols. The dialog layer 204 abstracts from the message layer 203 the details required to read and write messages across the network backbone.

Network layer 205 is the means by which connections are made between two peers. That is, network layer 205 is responsible for the specifics of how each peer instance is physically connected to and communicating with any other peer instances (e.g., TCP/IP, UDP, HTTP, FTP, etc.) Network layer 205 also handles exceptions, which occur between networked devices. In addition, the network layer 205 abstracts a network stack such that fully configured networks (TCP/IP, for example) operate the same as ad-hoc networks (UDP Multicast, for example). This abstraction provides the ability to create computing social networks in lieu of a physical network connection as traditional with physical or wireless protocols utilizing the TCP/IP protocol stack. In other words, devices can communicate without the presence of the Internet utilizing their intrinsic radio capabilities, for example.

Items 206-209 in FIG. 2 represent various connections to various network topologies which network layer 205 may use to connect peer 200 to one or more other peers for 1:1 bi-directional communications, 1:1 uni-directional communications, 1:k (one to a sub-set of all peers in the network) communications, and/or 1:all communications.

In one example, network layer 205 may connect to a network topology 206 comprising two peers in bi-directional communication, using some variant of network stack built upon the TCP/IP stack protocol, for example, including but not limited to HTTP, SSH, FTP, etc.

Network 207 represents a cloud structure of a network topology of two peers in uni-directional communication using some variant of network stack built upon the TCP/IP stack protocol, UDP UNICAST stack protocol, or other viable protocol, for example.

Network 208 refers to the cloud structure of a network topology of one peer in uni-directional communication with more than one other peer grouped together as a collection of communication peers known to the originator of the broadcasted message using some variant of network stack built upon the TCP/IP stack protocol, UDP UNICAST stack protocol, or other acceptable protocol.

Network 209 refers to the cloud structure of a network topology of one peer in uni-directional communication with all other peers in the same peer cloud using some variant of network stack built upon the TCP/IP stack protocol, UDP MULTICAST stack protocol, or any other viable protocol.

In another example, peer 200 may be connected to multiple peers in multiple network topologies at the same time (not shown).

Figure 3:
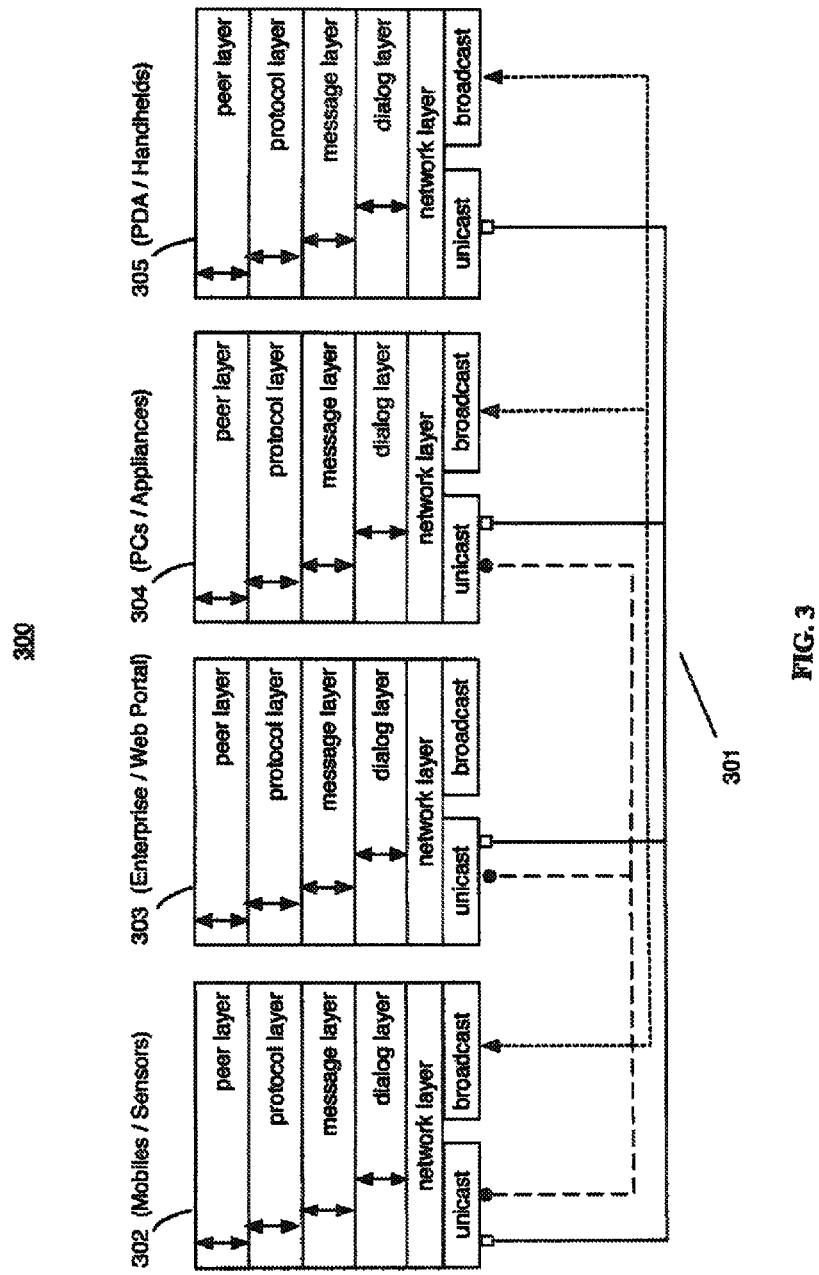
FIG. 3. shows an exemplary ad-hoc social network of collaborative peers configured in accordance with the present invention.

Turning now to FIG. 3, an exemplary ad-hoc social network 300 of collaborative peers 302-305 is shown. In accordance with the present invention, the peers (302-305) may be connected via both wired or wireless network connections 301. Further each peer may be connected to one or more of the other peers such that uni-directional, bi-directional, and/or multicast communications are possible.

The peers (302-305) of the ad-hoc computing social network 300 may comprise mobile phones, data/image sensors, printers (302), enterprise/web portals (303), personal computers (PCs), appliances, multimedia devices (304), hand held devices, personal data assistances (PDAs) (305), and any other computing/communication device. It should be noted that the peers of the exemplary network are not intended to be limiting. To the contrary, networks configured in accordance with the present invention may comprise any number and type of device capable of 'computing', where 'computing' may include, but is not limited to, the ability to execute instructions (e.g., contain a microprocessor), collect/process data, transmit/receive information, communicate with other devices, broadcast a signal (e.g., data mites), function as an identifier (e.g., RFID/tags), display/present information (e.g., table-top displays, advertisement billboards), static sources of data and information (e.g., barcodes, 2D barcodes, dynamic digital analog barcodes), etc.

It is important to note that each of the peers (302-305) of the exemplary network 300 illustrate the common architectural layers of the present invention, including, without limitation, the ability of each peer to: (a) connect to either a wired and/or wireless network connection based on the environment in which a computing device is found; (b) transfer and route conversational messages which frequently move between computing devices configured as peers; (c) communicate via a common protocol by which the computing devices are able to engage in utility (social) execution; (d) engage in specialized conversations through the advertisement of specialized instructions which allow peers to participate in different conversations based on domain specialization. Further, peers configured in accordance with the present invention are able to participate in both configured and ad-hoc network environments achieving distributed computing or execution across multiple configurations of different device allocations.

Aside from the exemplary configuration illustrated in FIG. 3, peers configured in accordance with the present convention may comprise various other types of networks. For example, a set of mobile communication devices configured in accordance with the present invention may be present in a college stadium. If the stadium has no wireless access point and/or EDGE/3G/etc. connections, nor any (or limited) Internet connections, the mobile communication devices may still be able to form a proximal network. Since the devices each comprise proximal networking capabilities (inherent in their respective architectures of supporting/hosting radio broadcasting hardware), a proximal network may be formed "on the fly" (i.e., ad-hoc). As a result, the mobile devices can begin to communicate, execute, and/or collaborate socially.

The foregoing example illustrates the concept of a 'proximity network'. As illustrated above, proximity networks do not require access to access points or to conventional Internet connection. Instead, devises create ad-hoc networks using their inherent radio capabilities. Aside from the campus stadium example provided above, this type of proximity network may be used for instances where communications are vital, but where conventional wireless connections are unavailable, such as in war situations or in disaster (e.g., natural disasters such as hurricanes, flooding, etc.) environments.

Another possible network configuration may include a set of mobile communication devices in a city street environment with wireless access point(s) and/or EDGE/3G/etc. connections. In the instant configuration, it is assumed that the mobile devices are aware of their respective locations (via, GPS, for example) and are able to find stores, which match the interest and buying behaviors of the owners of said devices. Optionally, the devices may also be able to identify/locate coupons that may be usable in particular stores, and/or track purchases associated with dynamic loyalty programs. In such a scenario, the network configuration may be characterized as a mixed environment comprised of the mobile communication devices discussed above, and fixed hardware, application servers, and GPS based servers for providing the aforementioned functionality (i.e., finding stores of interest, identifying device location, finding coupons, tracking purchases, etc.). Members of this type of network may opt-in, as opposed to have coupons and other advertisements 'pushed' to them as SPAM, for example. This way, members are able to limit and control which (if any) coupons or loyalty programs they are associated with.

In yet another scenario, a network configuration may comprise a set of fixed servers and specialized RFID-capable hardware such that manufactured products equipped and associated with RFID tags can be tracked and monitored throughout said product's distribution lifecycle, from manufacturing beginning to end user purchase, across disparate non-homogenous computing environments, and within distribution systems for which temporal and spatial disconnects are frequent and unpredictable. In such a scenario, said network configuration provides for distributed monitoring and tracking utilizing the fixed servers and specialized sensor hardware.

The foregoing are just a few of the limitless examples of how devices and networks set up in accordance with the present invention could be used to engage in 'social' type computing activity and as a result, collaborate to solve very complex problems, requests, and/or instructions in a manner that is very similar to the way humans interact and collaborate.

Figure 4:
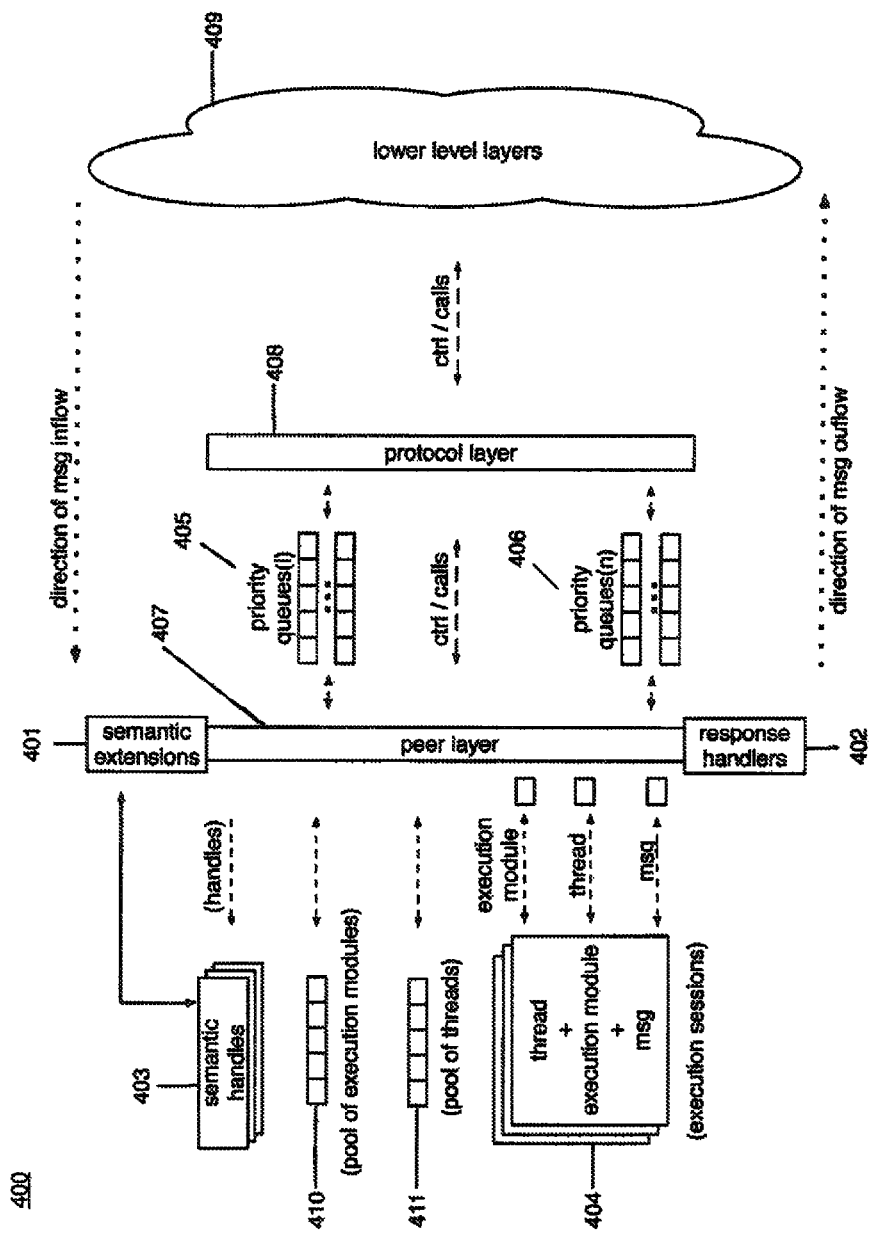
FIG. 4. shows a basic execution model of the peer and protocol layers of an exemplary computing peer configured in accordance with the present invention.

Turning now to FIG. 4, an exemplary execution model 400 of the peer and protocol layers 407, 408 of a computing peer configured in accordance with the present invention is shown. The exemplary execution model 400 illustrates that there is data and/or control flow between the peer layer 407 and protocol layer 408 via "ctrl/calls" linkages. Also shown is the overall direction of flow—messages (e.g., program instructions) to be acted upon by the said peer (i.e., inflow of messages) flow up from the lower level layers 409 (e.g., message layer, dialog layer, etc.) and messages that have been executed or acted upon (i.e., outflow messages) flow downward through the lower level layers 409.

Included, as part of the peer layer 407, is a semantic extensions module 401. This module 401 is the portion of the peer layer 407, which is used to describe or characterize those functional capabilities, which distinguish or differentiate one peer's capabilities from another's. Thus, semantic extensions are the descriptions or code added to particular utilities, software applications, etc. to make them readable as instructions by other peers, including those peers that do not themselves comprise the same utility, software application, etc. Examples of semantic extensions held in the extensions module 401 may include, but are not limited to, compiled code libraries, interpreted scripting languages, database engines, web invoked service invocations, hardware specific registers and ports, etc.

As noted above, all computing peers within a peer group configured in according to the present invention will be able to support and execute a common set of core codes or instructions. In order to provide uniqueness to each peer within the group, thereby increasing the overall utility and functional capabilities of the entire group, one or more peers in the group are preferably equipped with one or more additional capabilities so that other peers in the group are able to exploit these additional capabilities through semantics.

The peer layer 407 also includes response handlers 402. Response handlers 402 are responsible for enabling one peer to communicate, via semantics, the execution results of a particular instruction/program to other peers that do not necessarily comprise the ability to execute said instruction/program on their own.

Semantics, as noted earlier, are what enables different peers to communicate and engage in 'conversations' (that include exchanging execution results) via a 'common language'. These conversations may consist of sequences of both common semantics (i.e., semantics shared by all members of a social network) as well as unique semantics (i.e., semantics that are not necessarily included in all peer members, but included in at least one peer member). The response handlers 402 provide the means to communicate the results of unique semantics (which may include execution results) to other peers. To illustrate, if one peer is capable of executing a particular imaging instruction, response handlers enable that peer to execute the imaging instruction and communicate the result of said execution to another peer that is itself incapable of executing (or even understanding) the imaging instruction.

In addition to processing execution results that have been successfully completed (as in the example provided above), the response handlers 402 process four additional execution results: 1) the instruction(s) was executed and it "failed"; 2)

the instruction(s) was executed and it requests to be "routed" to a known peer; 3) the instruction(s) was executed up until the current instruction and therefore requests that the sequence of instructions be "forwarded" to a peer which can continue; 4) the instruction(s) execution was interrupted due to, for example, an expiration of a lease to execute on a peer for a fixed period, or an expiration of a lease granting access to critical or expensive resources, or expiration of a TTL grant (time to live guarantee). In this sense, response handlers are responsive to certain trigger points within the code itself. Therefore, even if something happens during execution of an instruction set, the handlers 402 will be able to continue to process said instruction set.

For instance, when an instruction has been executed and is "done", the response handlers 402 could perform (among other actions) the following: 1) insert the instruction results into a database of completed instruction results for post processing, at which point a peer group can be restructured to achieve better performance in both execution time as well as network bandwidth; and 2) send a notification to inform one or more peers that the instruction(s) have been successfully completed. In addition, the response handlers 402 could actually create a new instruction(s) and insert it back into the peer layers 407 for execution.

When the execution of an instruction has failed execution, a notification may be sent to the peer or peer group informing them that something out of the normal has occurred. The response handlers 402 may accomplish this by creating a specific instruction and re-inserting back into the peer layer 407 for execution.

When a particular instruction set is to be routed, this is indicative that the host peer has encountered a common core instruction within the instruction set which instructs the host peer to stop execution and to route the instruction set (as currently executed) to a known (or identified) peer for continued processing. There may be at least two outcomes of such an instruction: 1) the destination peer is indeed valid (i.e., exists in the host peer's group), at which point the execution session (i.e., the execution state, the instructions (including, any new, modified, and/or extracted instructions), and/or execution results) is routed it to the known peer; or 2) the destination peer is unavailable, at which point the instruction session (and any execution results achieved prior to the routing instruction) is stored for routing at a later processing/execution. In the latter case, a periodic check may be initiated to determine when the destination peer becomes available (e.g. a push model) or the destination peer can query the host peer when it comes online and joins the peer group for any stored instructions destined for it (e.g. a pull model).

When a host peer, in the course of executing an instruction set, encounters an instruction, which it does not understand or can not execute, the instruction set (at its current state) is forwarded. When this forwarding occurs, the response handlers 402 have a several options: 1) they can attempt to find a candidate peer which can continue execution (e.g., via metadata stored in the instructions); 2) store-and-forward the instruction set at a later date; 3) fail after several attempts; etc.

If the instruction set has to be routed or forwarded, as explained above, the instruction set may be modified to represent the current state of execution of the instruction set, whose results may be the queued via out-flow message dialog across the message priority queues 406. The actual execution of the instruction set occurs though an instance of the execution session 404.

Semantic handles 403 refers to the individually wrapped software 'artifacts' which are separate from the actual computing peer, but nonetheless are accessible and capable of being acted upon by the host peer. Software artifacts may come from a variety of sources: 1) command line executables, which are relegated to the world of the host operating system and software written for that environment (e.g., GIMP for image processing, DOS commands, Unix commands, shell scripts, W3C command line web queries, etc.); 2) code libraries written by other software developers for which there is a known application program interface (API) (e.g., MySQL databases, Exchange servers, Mail servers, etc.); 3) communication APIs (e.g., FaceBook RESTful™ API, HTTP post/get, etc.); 4) driver APIs to specific hardware (e.g., GSM hardware across port COM1, register settings for a dedicated air quality detection sensor, etc.). Each of these software artifacts has a specific format which allows it to be called and acted upon. As noted above, peers configured in accordance with the present invention are able to describe these different software artifacts in a uniform way. Once described in a uniform way, there is another subset of the code, which can take these descriptions and write the necessary code to wrap, them into an instruction format that is readable by other peers. Thus, semantic handles 403 are the code that is generated to 'wrap' software artifacts such that they will be readable as instructions by other peers.

Item 404 represents an execution session, wherein dialog messages (or instruction(s)) from the in-flow message priority queues 405 are paired with individual instances of an execution module taken from a pool of execution modules 410. The message and execution module are then combined with a thread from a pool of threads 411, and the combination initiates an execution session 404, wherein the execution module executes the message according to the thread of execution. In certain scenarios, in-flow messages may be executed serially (i.e., one after the other). In other scenarios, messages may be executed in parallel, each utilizing an individual execution module instance, an individual execution thread, and an individual execution session.

The execution of these messages (or sequences of instructions) may be considered a realization of 'conversation' from one peer to another, where the nature of the conversation is the direct result of a sequence of common and specialized codes within a set of instructions.

Once an in-flow message has been executed, the execution session 404 ends, the execution module instance and thread are each released back into their respective pools (410, 411), and the executed message (now an out-flow message) is queued in the outflow prior queues 406.

It is important to note that higher priority conversations are executed before lower priority messages, as enforced by the priority messages queues 405. It is also important to note that conversations between peers are independent and mutually exclusive with respect to each other (i.e., strands of instructions are 'stateless' with respect to each other). The message and dialog layers of a peer manage order or implicit linkage between conversations. The instant execution model 400 design provides for scalability in performance, response throughput as well as over-all real-time liveliness.

The in-flow messages (from external peers, for example) are queued according to priority via priority queues 405. The peer layer 407 iterates across the said queues 405 in priority order, associating said messages with available execution module instances 404. The determination of any message's priority is determined by the message layer (not shown), which separates any instructions from the actual peer message, which is communicated between peers and places the extracted instruction into the appropriate priority queue 405.

The out-flow of messages are also queued based on priority via priority queues 406. Outflow messages derive from the response handlers 402 which are addressing the disposition of any instruction which have been processed post-execution. These outgoing messages comprise the 'done', 'failed', 'route', 'forward', 'interrupted' execution status, and their destination, which is dependent on the execution status itself. For example, a message having a 'route' status will have a destination of a known peer, a message having a 'forward' status will have a token to the failed instruction to which a destination peer is able (and willing) to continue processing the current instruction set, and so on. The priority of any out-flow message is determined by the peer layer 407, which removes the outflow message from the execution environment 404 and places it into the appropriate priority queue 406. The message layer (not shown) iterates across the said outflow queues 406 in priority order, creating appropriate outbound peer messages to be communicated with the dialog layer (not shown).

It is important to note that the message layer (not shown) isolates the peer layer 407 from knowing the specifics of sending and receiving messages across the dialog layer (not shown) as well as from the format of the said message format. As a result, each layer need only be concerned with its particular responsibilities. As can be appreciated by those, in the art, this layering of responsibilities provides for robust system design.

Figure 5:
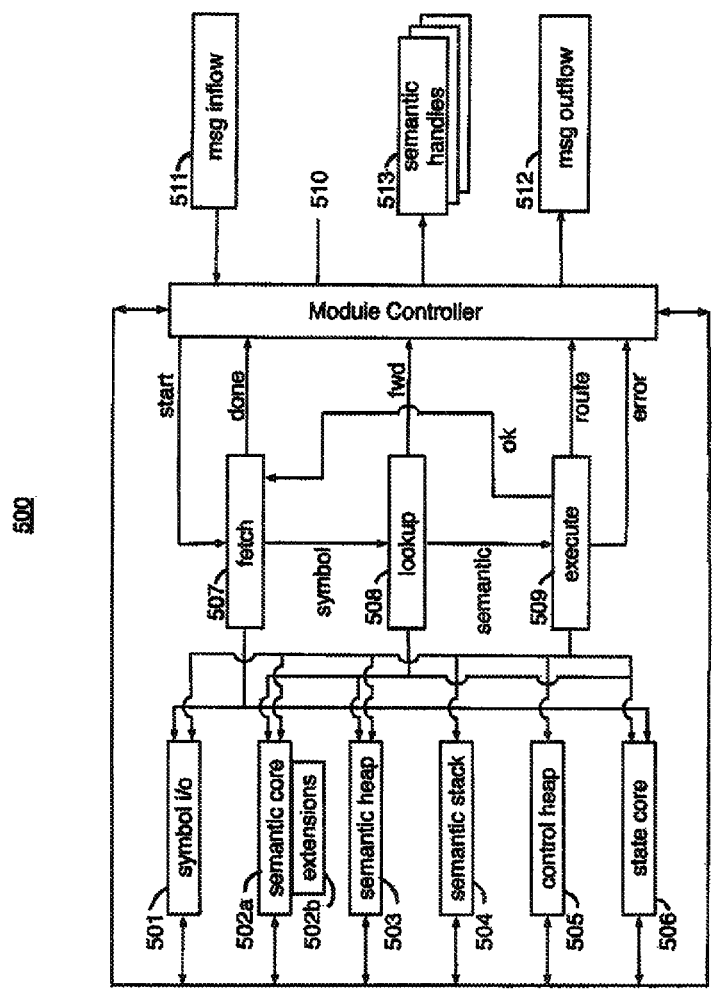
FIG. 5. shows a basic structure of an execution module of an exemplary computing peer configured in accordance with the present invention.

Turning now to FIG. 5, a basic structure of an execution module 500 of an exemplary computing peer is shown. For the avoidance of doubt, the following terms shall be given the following meanings: 1) a "message" comprises sequence(s) and the meta-level which articulates to what the message pertains and/or applies; 2) a "sequence" comprises instruction(s) and the meta-level which articulates to what the sequence pertains and/or applies; 3) an instruction describes exactly what is to be, executed; and 4) a "symbol" is a symbolic representation of an instruction. These terms may also be expressed as follows:

Message=1{Sequence [meta-data]}*–message is 1 to many sequences;

Sequence=1{Symbol [meta-data]}*–sequence is 1 to many symbols;

Symbol=symbolic id of an Instruction; and

Instruction={execution, requirements, results, meta-data, etc.}

Instructions know what it is they are to do, their execution profile, their requirements, their results produced and any of the meta-data which semantically addresses the nature of an instruction, where nature is defined as any and all aspects which represent a fine or coarse grained software artifact and/or thread of control and/or execution. Symbols can be anything, including but not limiting to a series of colors in an image patch work mosaic, a two dimension multi-sequence barcode of sorts, a series of alphanumeric characters, a series of binary codes, etc. For example, symbols may take the form of certain colors and/or multi-dimensional pattern combinations of color in an image, such that the image itself, when processed, contains the sequences of instructions to be executed. In this manner, a properly encoded image can contain the instructions required to process it for an on-the-spot loyalty program coupon, for example.

Turning again to FIG. 5, a basic structure of an exemplary execution module instance 500 of a computing peer configured in accordance with the present invention is shown. The exemplary execution module 500 exemplifies an actual executable conversation between peers within a computing social network in accordance with the present invention. The exemplary execution module 500 comprises a symbol I/O parser 501, a set of common core semantic instructions for Code mapping 502a, a set of semantic extension instructions for mapping to specific semantic handles 502b, a semantic heap for storing meta-level semantics defined by a sequence of said semantics 503, a semantic stack for storing semantics which are acted upon and/or created by semantic codes/instructions 504, a control heap for storing meta-level structures which control sequences of semantic symbols as a group upon which meta-level logics can be applied 505, a representation of the state of the execution module 506, a unit to fetch message/command symbols 507, a unit to perform a lookup of a symbol resulting in an executable semantic 508, and a unit to execute the said semantic 509. The architecture of the exemplary execution module 500 is unique and different from conventional stack-based hardware microprocessors, particularly with respect to the extensibility of both the instruction core and the data types.

The symbol I/O 501 refers to the unit in the module 500 responsible for the loading of a conversation message into an I/O stream through which both read and write access of individual symbols within said message can occur. The symbol I/O unit 501 parses the message to identify its symbols, which may then be looked up in the semantic core/extension instruction sets (502a, 502b). At that point, the symbols are resolved to a particular handle, that handle is then able to manipulate entries of an execution data stack. Collectively, the symbols are akin to a string representation of the common core instructions and the non-common extension instructions. Ultimately, the symbols represent a symbolic name by which a software handle may be called upon to execute its runtime behavior. Further, since semantics are actionable entities inside a hosting computing peer, message sequences contain symbols, which map to the corresponding semantic handles, providing a compressed representation. Furthermore, a symbolic representation permits operations such as, but not limited to, pre-flight verification, sanity based verification, cost and performance pre-analysis, etc.

As noted above, the semantic core/extension instruction sets (502a, 502b) refer to the units in the module 500 responsible for providing the translation/mapping of message symbols with actual semantics to be executed. As previously discussed, the message symbols may comprise: 1) common core semantics; 2) semantic extensions. Semantic extensions relate to those functional capabilities that are unique to a particular peer, and which differentiate it from other peers, for example. These semantic extensions may include, but are not limited to, compiled code libraries, interpreted scripting languages, database engines, web invoked service invocations, etc. Further, these semantic extensions may include RFID hardware devices, multiple-dimensioned barcodes, data sensor swarms or any other hardware device accessible via a hardware interface.

The semantic heap unit 503 refers to the unit in the exemplary execution module 500 responsible for storing meta-level semantics defined by a sequence of said semantics. Meta-level semantics are a logical grouping of a sequence of message symbols, which are referenced as a singular group. These meta-level semantics are similar to a procedure or a block or a lambda expression in traditional programming languages. However, unlike with conventional programming languages, the present invention allows for the re-writing of both the individual symbols and/or entire meta-level sequences.

In accordance with the present invention, sequences can grow and shrink in accordance to their particular objective, which can change from time to time as a result of certain events. For instance, if a particular message includes a sequence of instructions, which a particular peer is unable to execute, the execution module of said peer may insert new instructions into the original message to enable the remaining instructions to be executed. In such an example, the newly inserted instruction may require the bundling of the entire message session (which would include the executed portion of the message and the remaining unexecuted portions thereof), forwarding or routing the bundle to a neighboring peer to continue execution of the message instructions, and returning the results (with the bundle) once execution is completed. As a result, the execution module is able to perpetuate the execution of the entire message, even if it may not (or is unable) to execute all of the message instructions itself. In essence, the execution module is "re-writing" the message on the fly in order to ensure that all of the instructions are executed. Notably, the execution module may insert other instructions, such as to erase previously inserted instructions, to optimize the continued execution of the message instructions. This ability to write and insert instructions into existing programs structures is one of the very many features disclosed herein that distinguish the present invention from the rest of the art.

As illustrated above, changes to instruction sequences may include the addition of code, the removal of code, and/or a modification of code. Examples of why sequence-changes may be necessary include, but are not limited to, changes in a network, failure of a peer to execute a particular instruction, user preferences, user customizations, etc. Although similar in filtering capabilities to the symbol I/O unit 502, the semantics heap 503 further understands the meaning of a sequence and can operate on that sequence accordingly. Furthermore, semantics on the semantic heap 503 can be referenced by a symbolic equivalent, which may occur in later portions of the same message, or the meta-level semantic may be used in later stage processing within an entirely different message. Therefore, meta-level semantics have a lifetime beyond the particular message in which it is created, manipulated, or executed upon.

The semantic stack 504 refers to the unit in the exemplary module 500 responsible for storing semantics, which are acted upon and/or created via semantic codes/instructions. One type of semantic, which can be placed upon the stack 504, includes those referenced within the semantic heap 503. Other types of semantics which can be placed upon the semantic stack 504 include data primitive types common to XML as defined by the W3C XML Schema Part 2: Datatypes Second Edition, for example. Therefore simple types such as integer or data/time and others can be stored and acted upon within the semantic stack 504 by semantic codes/instructions. As a result, the execution module 500 is able to execute instructions well beyond those executable by common architectures by exploiting the fact that social networks work in concepts and abstractions, which are difficult to represent in simple data types. In addition, it is noted that the execution module 500 can also process semantics defined in the W3C RDF/XML Syntax Specification (Revised) and its variants including, but not limited to, the W3C OWL Web Ontology Language, or the Notation3 (N3) specification which is a shorthand non-XML serialization of the aforementioned RDF models, for example.

The control heap 505 refers to the unit in the exemplary execution module responsible for storing control level meta-level semantics. Meta-level control semantics are special case semantics, which may include structural meaning. As a result, these control semantics are different from previously discussed. Indeed, control meta-level semantics cover a range of definitions encompassing structures which fork, loop, test on conditionals, branch to different places, etc. based on a local state. As such, these meta-level control structures impose a specific meaning (or action or qualifier) upon a particular sequence of semantics. While meta-level control semantics, like those of the semantic stack 504, may be acted upon as a group, meta-level control semantics within the control heap 505 may individually envelope and impose additional controls upon the semantic stack 504 semantics. This separation of control from execution is important for many reasons including, without limit, it allows for the use meta-level data as a means to insert or delete additional instructions into a message sequence.

To illustrate, take for instance a looping sequence, which at the end returns to its beginning. The method by which the return occurs may not be fixed as in compiled programs since the return point maybe variable depending on whether the sequence has been modified via the insertion or deletion of addition instructions (as discussed above). This invention recognizes that the separation of the sequence from the control makes it possible to manipulate both entities more efficiently allowing for the infinite possibility of rewriting both the sequence and the control meta-level semantics on the fly. This permits the introduction of self-modifying code in a real time context, something which modern day software cannot begin to emulate.

The state core 506 refers to the unit in the exemplary execution module 500 responsible for storing state, as well as the overall message execution environment. The term "state", as used herein, refers to the particular status of an execution session, which includes the execution module and the particular message being executed by said execution module. As noted above, a message may comprise one or more instructions to be executed. State refers to the status of such execution, and may include execution parameters such as errors, exception, etc.

The fetch unit 507 refers to the unit in the exemplary execution module 500 responsible for the fetch-lookup-execute loop of the said module 500. The fetch unit 507 may access the symbol I/O unit 501 to acquire a symbol, which it passes onto the lookup unit 508 (discussed further below). The fetch unit 507 may also access the state core 506 to ascertain the state of the execution module 500. Depending on the symbol I/O unit 501 and the state core 506, the fetch unit 507 may determine if the fetch-lookup-execute loop is completed (whereby the thread of control is returned to the module controller 510) or if there is a valid symbol, which can be passed to the lookup unit 508.

The lookup unit 508 refers to the unit in exemplary execution module 500 responsible for translating symbols (or symbolic tags) of a semantic to an actual semantic handle. The lookup unit 508 accesses the semantic core/extensions units 502a/502b as well as the semantic heap unit 503. These units (502a/502b, 503) contain semantics referenced by a symbol, which the lookup unit 508 may resolve. If no semantic is found for a particular symbol, the execution module 500 may be placed into a forwarded state. A forwarded state is indicative that the current computing peer (hosting the execution module 500) does not host said semantic (for the particular symbol) and as a result, the thread of control of the message comprising said symbol is passed to the module controller 510. The module controller 510 may then temporarily suspend or 'freeze dry' the current execution session, which may then be passed to a different computing peer as an outflow message 512 to continue the thread of execution.

The term 'freeze drying' refers to the process of saving an entire state of an execution session in a format, which allows it to be reinstated at a later time, such that the execution session may continue as if it never ceased. The freeze-dried session may include all parsed symbols, all unparsed symbols, instructions or sequences referenced by symbols, data types pushed to the execute stack, execution structures pushed to the control stack, and the state of the module controller 510.

Freeze drying is also the means by which execution sessions may be moved from one peer to another seamlessly until an entire execution session lifecycle is completed. Once an execution session is freeze dried, it may be sent to a peer capable of continuing execution of the session. If a peer is not available to continue the session, the freeze-dried session may be stored for any length of time until a suitable peer becomes available. One method of finding a suitable peer (to continue the execution session) is to query a computing network. This querying may include cache based lookup, network search and discovery, RDF (Resource Description Framework)/XML based language queries, etc. In instances where there are multiple computing peers capable of continuing an execution session, it is up to the host peer's response handlers to decide which of the available peers will receive the freeze-dried session. In making such a selection, the host peer may use criteria that includes, without limit, cost and performance analysis, network proximity, time and priority, quality of service, rank order within the peer-computing network, recommendation based selection, etc.

The execute unit 509 refers to the unit in the exemplary module 500 responsible for invoking a semantic handle and providing the appropriate environment for executing message symbols. The execute unit 509 operates on an inversion of control architecture, which isolates the environment whereby the semantic handles are controlled. Inversion of control operates on the premise of 'don't call us, we'll call you', whereby semantic handles do not take control, but expect to be controlled and have everything handed to them via the environment provided by the execution module 500. This architectural feature allows for improved handling of dependency control, lifecycle control, resource control, exception handling.

The module controller 510 refers to the unit in the exemplary module responsible for taking message in-flow 511 and instantiating the various units of the execution module 500 so as to affect execution of said message 511. As noted above, this module controller 510 is also responsible for freeze-drying execution messages and sending them out as outflow 512. In essence, the module controller 510 is responsible for the setup and teardown of the execution environment for each and every inflow 511 and outflow 512 message.

Figure 6:
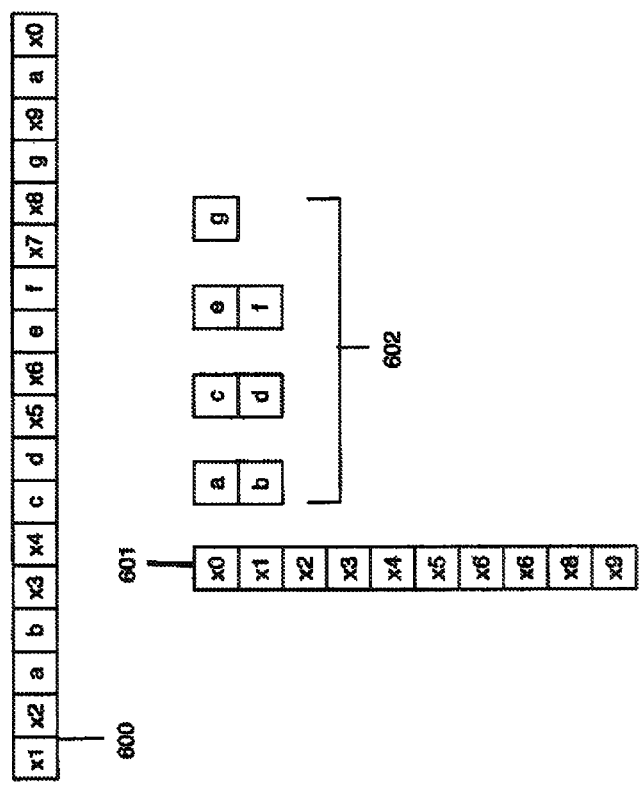
FIG. 6. shows an exemplary program instruction comprising both common and extension instructions.

Referring now to FIG. 6, an exemplary program instruction sequence 600 is shown. Included within the exemplary sequence 600 are a set of 'core' or common symbols 601, and semantic 'extension' symbols 602. As discussed above, 'core' symbols are those that are common to all peers of a computing social network. As a result, any peer within said computing social network will be able to fully execute all of the core symbols 601 within said sequence 600. The semantic 'extension' symbols 602 are those symbols, which require additional functional capabilities (above and beyond the 'core' capabilities of a common peer). Thus, not all peers in the computing social network will be able to execute the extensions 602. To the contrary, only those computing peers configured with the extension capabilities will be able to execute the listed extension symbols 602. If no single peer in the network is capable of executing the entire sequence 600, then the sequence 600 may be executed 'socially' via distributing said sequence 600 among several peers (each having one or more of the extension capabilities) who collaborate to execute one or more symbols until the entire sequence 600 is executed. An example of this collaborative execution is further discussed below with regard to FIG. 7.

For illustrative purposes, the exemplary program instruction sequence 600 may be described mathematically by a 7 element tuple=$(Q,P,\Gamma,E,\delta,A, Z)$, wherein Q is a finite set of initial states {pending, route, forward}

P is a finite set of accepting states {done, interrupted, error, forward, route, pending, unknown}

$\Gamma$ is an infinite set of symbols (common core symbols plus semantic extension symbols plus literals)

$\Sigma$ is the sequence of symbols (e.g. the program instruction sequence 600) $\{\Sigma \subseteq \Gamma\}$ $\delta$ is relation on states and symbols called the transition relation $\{\delta:Q\times\Sigma\}$ A is the initial state $\{A\epsilon Q\}$ Z is the final state $\{Z\epsilon P\}$ As illustrated, the exemplary sequence 600 includes 18 symbols ($\Sigma \subseteq \Gamma$), where (x0-x9 $\subseteq \Gamma$ represent a subset of common core symbols) and (a-g $\subseteq \Gamma$ represent a subset of semantic extensions), where (A=pending, $A \subseteq Q$ represents an initial pending conversation), where ($\delta$ is the result of executing $\Sigma$), where (Z$\epsilon$P, where pending implies freeze-drying state, route implies moving thread of execution from one peer to another named peer, forward implies finding a peer within the social, network capable of continuing the thread of execution, finished implies the conversation is finished successfully and dealt with as appropriate to the response handlers, interrupted implies the conversation is forced to cease and dealt with as appropriate to the response handlers, and where error implies the conversation failed and dealt with as appropriate to the response handlers). It should be understood that the exemplary program instruction sequence may be comprised of more or less total symbols, and wherein the total symbols may include any number of common core symbols, any number of semantic extensions, and any number of variants thereof known as literals. Literals may be considered in the domain of numbers and strings and other data types (semantic data types).

In view of the mathematical representations above, the common or core symbols may be expressed as $\{x0\text{-}x9 \subseteq \Gamma\}$, and semantic extensions may be expressed as $\{a,b,c,d,e,f,g \subseteq \Gamma\}$. As noted above, one or more of these semantic extensions may be present in one or more peers. As a result, it may require multiple peers to fully comprise the necessary functionality to fully execute the entire program instruction sequence 600.

Figure 7:
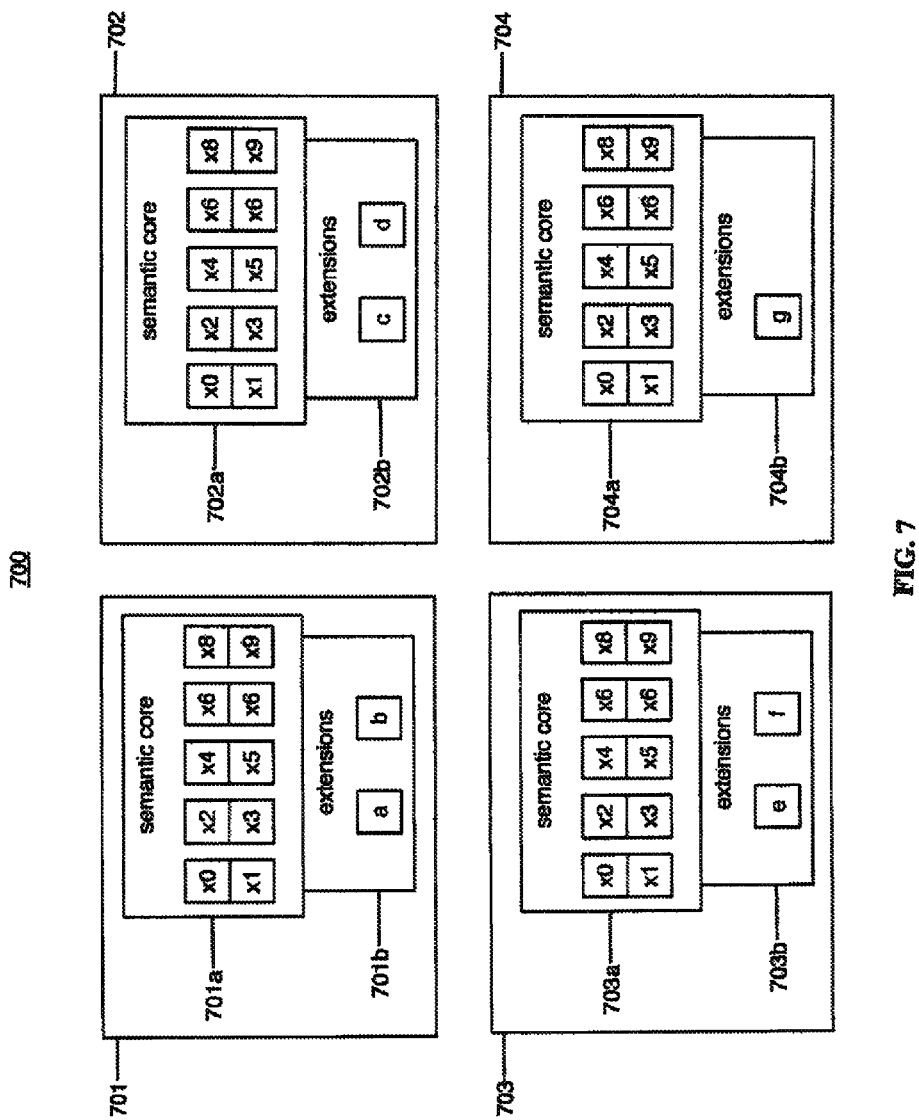
FIG. 7. shows an exemplary computing social network configured for collaborative execution of an program instruction sequence comprising both common and extension symbols.

Referring now to FIG. 7, an exemplary computing social network 700 configured for collaborative execution of a program instruction sequence is shown. As shown, each peer (701-704) in the network 700 comprises a respective semantic core (701*a*-704*a*) and semantic extensions (701*b*-704*b*). As a result, each peer 701-704 may execute any of the common or core symbols x0-x9, but only peer 702 is able to execute extension symbols a and b, only peer 703 is able to execute extension symbols c and d, only peer 703 is able to execute extension symbols e and f, and only peer 704 is able to execute extension symbol g. However, since each peer 701-704 comprises a respective semantic core 701*a*-701*b*, the peers 701-704 may communicate with each other and collaborate to utilize each other's semantic extension capabilities.

For example, and solely for purposes of illustration, reference is again made to the exemplary program instruction sequence 600 of FIG. 6. No one peer of the network 700 is capable of executing the entire instruction sequence 600 by itself. However, collectively, the peers 701-704 may collaborate to execute the program instruction sequence 600.

For purposes of this illustration, it is assumed that sequence 600 begins at peer 701. As a result of its semantic core 701a and extensions 701b, peer 701 is able to execute the first six symbols of the sequence 600 (i.e., x1, x2, a, b, x3, x4). The next symbol, c, is not executable in peer 701. As a result, peer 701 may freeze-dry the execution session (as discussed above), insert an instruction to send the session to peer 702, and send the freeze-dried session (or a portion thereof) to peer 702, which is capable of continuing execution of the sequence 600. Peer 701 (and all of the other peers 702-704) may query or have prior knowledge of the capabilities of the peers within the network 700.

Once the freeze-dried session arrives at peer 702, peer 702 're-hydrates' the session (i.e., the reverse of freeze-drying) and continues to execute the sequence 600. Based on its semantic core 702a and extensions 702b, peer 702 executes the next four symbols (i.e., c, d, x5, x6). Peer 702 is incapable, however, of executing the subsequent symbol, e. Thus, similar to peer 701, peer 702 may freeze-dry the execution session (and optionally insert and/or remove instructions) and send the session to peer 703 to continue execution. It should be noted that peer 701 may have inserted instructions to dictate to peer 702 to stop after symbol x6, or peer 706 could have deduced it on its own. In fact, peer 701 could have inserted instructions to guide the execution throughout the entire network, to minimize the input required by the additional peers, or to delete previously inserted instructions to maximize efficiency, for example.

Once peer 703 receives the freeze-dried session, it may similarly re-hydrate the session and continue to execute the sequence, including symbols e, f, x7 and x8. At that point, the session may again be freeze-dried (in a manner similar to those discussed above) and sent onto peer 704 to execute symbols g and x9; and back to peer 701 to complete execution of the sequence 600 with the execution of symbols a and x0.

Thus, as illustrated above, each of the four peers 701-704 may collaborate to execute a complex sequence 600, thereby exploiting the capabilities of the entire network 700. It should be noted that this type of collaborative execution is not limited to four peers, or to any number of sequences. To the contrary, a collaborative network of peers in accordance with the present invention may comprise any number of peers, and they may collaborate to execute any number of sequences or symbols, whether serially or in parallel.

As will be appreciated by those of skill in the art, the novel sociable computing methods, program/instruction migration, computing social networks, and/or social peer discussed above may be implemented in countless industries and applications. For illustrative purposes, embodiments of the present invention will be described in terms of the Video Gaming, Supply Chain, Security, and Health Care industries. It should be understood, however, that the present invention is not limited thereto. To the contrary, the present invention may be implemented in any industry.

As a first example, the present invention may be implemented to improve the overall gaming experience for users by expanding the functionality, efficiency, and abilities of gaming devices and by improving communications amongst users and/or gaming devices. In such an implementation, gaming devices such as cameras, video game consoles, portable video gaming consoles, web cameras, may be configured as network peers in accordance with the present invention. As a result, a gaming program being played say, on a video game console, may be migrated onto a handheld gaming console, where gaming may continue. To illustrate, if a user were playing a video game on a Playstation 3®, for example, the user may migrate the actual gaming session onto his handheld PSP® (or iPod, or any other hand held device) and continue his gaming experience seamlessly. The user may then migrate the gaming session onto another gaming console (e.g., XBOX 360®) at a remote location.

In another gaming example, a user may use network peers (e.g., servers, cameras, GPS devices, etc.) to create a virtual game, wherein the scenery of the game is taken from the user's actual environment.

In yet another gaming example, a user may have a game which interacts on their mobile device in a very personal fashion, and as soon as a friend or some other vetted participant comes into close proximity to said user, the interactive game migrates from the said users mobile device to the other participant's device. In this example, the network of peers forms the interactive game environment for components to, migrate and continue operation on different peers where the migrating interactive game may end up back on the originating user should said user enter into proximity of a hosting participant. This example illustrates the ability to execute gaming experiences outside the originating device, thereby converting network peers into a multi-user, multi-device interactive gaming platforms.

In a Supply Chain industry, networked peers (e.g., monitors, RFID tags, servers, inventory scanning devices, etc.) may be used for just in time (JIT) manufacturing and/or JIT-based ordering. As goods are consumed or ordered, the various peers can communicate inventory levels to each other and as a result, trigger alerts such as 'time to increase/decrease manufacturing levels', 'time to order additional raw materials', etc.

In the Security industry, the present invention may be used to improve security and/or adjust security levels according to the particular characteristics of data being communicated between peers. For example, rather than simply treating all data with the same level of security (which can be very expensive), data may be classified such that highly confidential information (e.g., business documents, legal communications, etc.) may be highly secured, and public data (e.g., public photos, public information, etc.) may be transmitted with no security at all. This classification may be included as part of a message or instruction set as meta-data.

Continuing in the Security industry, the present invention may be used to take advantage of a "Zero-Knowledge Proof" security scheme. Under such a scheme, partial information may be sent from each of a sub-group of peers in order to create a community key. This community key will not be known to any one peer in the sub-group, nor will peers which are not 'members' of the particular sub-group be able to participate in secure communications with the sub-group. As a result, sub-groups of peers within a computing social network will be able to communicate confidentially, without having to worry about any other peer listening in, or without having to worry about any one peer within the sub-group divulging the key. In instances where a secure communication must pass through one or more peers which are not members of the secure sub-group, the communication may be wrapped in layers of encryption, one each for each non-sub-group peers that must receive and pass the communication along. As the communication arrives at each peer, one layer of encryption is removed until the communication reaches its destination peer. By the time the communication reaches the destination peer, only one layer of encryption will remain, and this layer may only be decrypted with the 'zero-knowledge' community key.

In the Healthcare industry, the present invention may be utilized to bring treatment to those patients whom themselves cannot (or may not have time to or may not have the immediate means to) attend a hospital or doctor's office to receive treatment. For example, rather than attending a doctor's office to receive an EKG or a blood test, devices configured for taking and communicating EKG or blood test readings may further be configured as network peers according to the present invention. This way, a patient may take his own EKG reading or a blood test, and have the results thereof communicated to server peer at the doctor's office or hospital.

The present invention may also be used to locate physicians, hospitals, or pharmacies when traveling outside of one's local area, or to enable secure communications between doctors and patients. To illustrate, if a patient is traveling on vacation, but forgets his/her prescription, the patient may use his/her networked peer to communicate the lost prescription to his/her doctor. The doctor may then use his networked peer to locate a pharmacy that is near the patient, and forward a new prescription to that pharmacy. Peers at the doctor's office and/or pharmacy may then communicate to the patient that the prescription has been filled and is ready for pickup, and provide driving directions from the patient's current location to said pharmacy.

In another exemplary embodiment, the present invention may be utilized for sociable networking, the migration of control structures across peers and/or peer networks. As will be appreciated by those of skill in the art, existing software development standards driven by "top down" methodologies are neither able to address nor anticipate changes to business procedures, changes in the marketplace, changes in the deployment platform, or changes in user experiences as rapidly as control structures because (among other reasons) conventional systems and methods are fixed at the machine code and/or byte-code level. The present invention, on the other hand, enables peer social networks to adapt to different (typically non-compatible) standards and/or coding methodologies to leverage or utilize the full resources and benefits derived from multiple peers across any number of networks, even if only for limited periods of times during which certain peers enter the peer social network.

As noted by the illustrative examples above, the present invention may be implemented into any industry where communications and computing functionality may be improved.

In summary, the present invention is directed to methods, apparatus, software and hardware for sociable computing in ad-hoc and configured peer-to-peer networks, that include (among others) the following features:

a. mobile device software platform that resides on a wireless communications network, rather than on the mobile device itself;

b. using a communication network (whether wired, wireless, ad-hoc, and/or configured) to function as a microprocessor for the software platform, with each peer in the network comprising its own operating system and individual program execution capabilities;

c. using a peer-to-peer infrastructure for enabling shared program execution power/ability amongst a social network of devices within the same or in different computing social networks (akin to "sociable computing");

d. use of a proprietary 'iDNA' programming language, which uses recursive structures to semantically "wrap" or encapsulate software applications to enable them to function as instructions that are readable by peers in the network;

e. each peers in the social network having a common or 'core' set of instructions, in addition to having its own individual instructions representing the ability to execute one or more different software applications;

f. instructions are sequenced and executed in order; one peer executes all instructions until it reaches an instruction it can not execute, at which point it will search for a peer to execute; the execution path may be akin to a post priori schedule (i.e., the start and end of the instruction sequence is known, however, the actual path taken to complete the sequence is unknown);

g. alternatively, execution paths may be chosen according to previously defined routing tables; or they may be suggested by the system;

h. utility execution is accomplished without downloading any code onto the network peers; as a result, there is no chance of infecting the network peers with a virus;

h. since networks are dynamic insofar as their topology may constantly be changing, the present invention updates and determines 'best paths' for routing execution instructions according the current network topology;

i. the program instructions of the present invention (i.e., semantically encapsulated software applications) may be used and re-used to generate new or revised programs, together with any requisite and/or control data;

Other key aspects of the present invention include:

a. the present invention provides novel means and methods for building collaborative peer-to-peer systems;

b. unlike traditional peer-to-peer system which are "data sharing" centric, instances (i.e., devices and/or networks) of the invention are "execution and computational sharing" centric—in other words, all forms and usages of computing and computing resources are shared and accessible to any peer as if the peer natively hosted said computing and/or computing resources;

c. the present invention may be implemented using both fixed (immobile) and mobile devices;

d. devices configured in accordance with the present invention can connect to each other and/or networks using traditional network connections and/or wireless proximal ad-hoc connections;

e. connection frameworks may utilize the broadcasting abilities inherent to mobile radio units;

f. connection frameworks may utilize the routing capability from device to device;

g. mix-and-match connections (e.g., wired and wireless) may be used to achieve sub-optimal to optimal network configurations;

h. multiple and mutually exclusive and independent peer and network configurations may be derived from the present invention;

i. an instance of invention does not require a central server, thereby enabling devices (peers) which support mobile radio sets to create proximal networks for devices which may not be in range of a wireless access point;

j. an instance of the present invention may run collectively among proximal devices (e.g., mobile radio sets), fixed devices, or a combination of both;

k. an instance of the present invention does not require network administration to be setup;

l. an instance of the present invention supports devices entering and exiting network configurations without having to 'know' about the devices in advance, thereby creating ad-hoc collaborative systems which may be in a constant state of flux, while maintaining the ability to run existing applications and engage in sociable computing/execution;

m. an instance of the present invention supports distributed computing among computing devices;

n. an instance of the present invention may offload, memory/processor intensive work from a mobile computing device to a collaborative network of peers which may include fixed computing servers, for example, where said work is executed and results of said work are returned to any number of possible destinations, one of which maybe the original mobile computing device;

o. an instance of the present invention can build a system where multiple and different computing devices as well as standalone devices may participate with each other simultaneously;

p. an instance of the present invention provides security preventing peers or other forms of computing devices or network hardware which are not part of the collaborative environment from 'understanding' the conversational content of said environment, thus providing "peer confidentiality"

q. an instance of the present invention prevents peers or other forms of computing devices or network hardware which are not authorized to participate in a particular peer-to-peer 'conversation' from participating in any aspect of said restricted or secured conversation, even though they are permitted within the confidential sphere of a said network;

r. an instance of the present invention may prevent peers from performing and/or executing any or all aspects of a conversation without proper and valid authentication of capability and "execution, environment" intent—thus providing "execution environment" authentication and execution sandbox protection;

s. an instance of the present invention where peer to peer authentication is based on zero-knowledge proofs and therefore do not require a central server or a shared encryption key—thus providing for a collaboration environment which is self-secured and can not be coerced for encryption information t. an instance of the present invention enables peers to be aware. Of other peers' capabilities and 'intent' and therefore create on-the-fly knowledge representations of the peer environment—thus providing for dynamic routing tables for conversations;

u. an instance of the present invention enables peers to facilitate in the migration and transfer of a conversation based on the intended results of the conversation and the intended purpose(s) of said peers in configuration—thus providing for realtime routing optimization;

v. an instance of the present invention supports applications which may execute on top of the whole such that the "execution environment" morphs and migrates across a sub-set of peers in order to achieve the execution results;

w. an instance of the present invention supports multiple mutual exclusive and independent "execution environments" known as conversations—said conversations may involve as many peers required to achieve its completion where said conversations migrate from one peer to another peer or to multiple peers in the case of multicast conversations in order to execute x. an instance of the present invention supports conversations being altered, mutated, rewritten, and self-modified in order to achieve an execution objective, thus conversations are dynamic and the nature and content can change to achieve objective;

y. an instance of the present invention supports conversation containing instructions common to all peers regardless of their configuration, and may also contain instructions which are specific to a single peer or group of peers;

z. an instance of the present invention provides for routing conversations using information provided by one or more peers in a group;

aa. an instance of the present invention enables conversations to "execute" in different spatial configurations (e.g., different peers during its execution lifetime) or in different temporal configurations (e.g., conversation is postponed due to restricted resources, key peer missing from conversation, stored-and-forward at a specified future time, or triggered when certain events take place);

bb. an instance of the present invention may be used to offer or 'lease' one or all of the collaborative functional abilities of a group of collaborative peers to other peers that are not a part of the collaborative network—in other words, the present invention supports leasing of network conversations, services, peer participation, peer group affiliation, connections, collaboration, etc.

cc. an instance of the present invention creates new means and methods for creating ad-hoc collaborative sociable computing of scale and of reach;

In summary, the present invention may combine control structures with mobile computing to create an augmented music reality for users, directed to methods, apparatus, software and hardware for sociable computing in ad-hoc and configured open and closed peer-to-peer networks, that include (among others) the following features (but not limited in scope by the exemplary examples provided):

a. fans can buy music from control structure enabled artists that are on stage performing live in front of them or streaming to them live from a control structure enabled venue thousands of miles away.

b. artists can sell their music using their own preferred licensing terms (e.g., including, but not limited to, purchased, leased, time-trial, pay-per-use, promotional freebie), terms which will travel with the music so the artist will never lose control of it.

c. fans can give artists live feedback during performances, providing the artist with reactions and thoughts about a song, or the set that night, so that they can continue to connect to their audience, giving the best, performance every time.

d. artists, vendors and sponsors can place geo-location sensitive ads and promotions to drive participation and awareness.

e. venues can sell drinks and food without cash or credit cards, and vendors can sell merchandise to fans without exchanging cash.

f. valet services that will inform fans of parking and transportation options, and other important areas, such as shuttle and taxi locations.

g. producers, sponsors, and artists will benefit from the deep data analytics on all of those transactions, and across the many different relationships and interactions between control structure participants.

h. sell music to fans using the artists' preferred license agreements and terms, or with links to other music sources where the artist's music is already being distributed and sold to consumers under existing license agreements.

i. instead of fans searching for music, music seeks out the fans based on continuously updated control structure information provided by users directly or by their usage and interactivity.

j. stream live music from any performance, and that music will find and identify fans that will have the opportunity to discover and connect to this new music and artist based on their music genre tastes.

k. launch viral marketing and promotional campaigns to an existing fan base or just to control structure users who are nearby that might become potential new fans. Use these, promos to market music, current or upcoming shows, new CD's, limited edition items, merchandise or promotional giveaways. Artists can also use control structure to promote a new video or drive traffic to the artist's official website. If users are at a venue, their control structure will guide them to the location or to the vendor where they can acquire these items.

l. watch the karma atmosphere that they are generating from a crowd or audience during their performance and respond to it in real time. Artists can tests new songs on their audiences to gauge their level of excitement, likes or dislikes. Karma atmosphere can include, but is not limited to, graphic meters and visual interactive means of providing feedback into a control structure with regarding to how good something may be (e.g., good karma) to how bad something may be (e.g., bad karma).

m. guide artists and their tour staff to dressing rooms, production offices, VIP artist lounges or villages, catering, and other artist specific locations.

n. show the artists and bands, or their tour staff, the load-in and load-out schedules, sound checks, show times and set length, scheduled on-site media and interviews, and contact details for relevant production contacts all in real time.

o. ultimate guide to food and merchandise vendors, ATMs, bands, multiple stage locations, medical attention, bathrooms, lost & found, lost child reunification, designated family friendly areas, ADA compliance and accessibility, exits and entrances, parking, shuttles and taxi areas.

p. create your own points of interest within a given venue by dropping, describing and assigning icons to pins. For example, drop a pin at your car's location to help you find it later.

q. select the bands that you want to see, and control structure will send you a performance alert and guide you to the stage. control structures will also recommend bands based on your information to help you discover new music.

r. find live music streams (or live music streams will find you) and view the performance, even when you are not physically at the venue.

s. pay for tickets, cover charges, merchandise, food and beverages, all using the same credit card, debit card or PayPal account.

t. buy music from artists based on licenses defined by the artist versus a third party.

u. look at an overall list of everything that is available for sale at the venue. For example, bring up a list of all the food for sale in the venue, search for the item you are interested in, explore all the food option menus and control structure will guide you directly to the food you desire.

v. exchange control structure information with people you meet at a festival. For example, send them your email address through your control structure. If you have your "Find Me" beacon on, anyone who has exchanged information with you can find you if their control structure is activated. Your "Festival Buddy" can select you and control structure will show them the way to you.

w. send out karma vibes from anywhere inside the venue and relate it to whatever is physically close. Heard a really awesome band—send out a good karma vibe. Port-a-potties totally gross—send out a bad karma vibe. Patrons can then review real-time karma atmosphere (think weather map meets aerial festival site map). Karma vibes slowly go away on their own after 30 minutes unless they are refreshed.

x. become the ultimate VIP tipster with all the inside information. With a more exclusive VIP ticket you will know about the locations of the private hospitality areas, special stage viewing areas, shuttle service from stage to stage, catered cuisine, complimentary bar service featuring specialty drinks, craft beers and wine, spa services and special access to VIP Package Upgrades and Offers such as on-site parking, luxury hotel accommodations and luxury ground transportation options to and from festival, grounds.

y. see prices in the currency of your choice and the local currency. See virtual signage in the language of your choice. See distances to selected items in the augmented reality displayed in your units of measure (feet, meters, paces).

z. create the entire venue virtually by walking the site using smart phones to create the venue by dropping pins, describing each location, and determining and specifying logistical needs to assist in the build out and creation of the event site. This also enables the promoter, production team and site facilitators to create a digital visual of the venue by switching into "test" mode, where they can accelerate pre-production planning phase. They can then review the entire venue specification online and make modifications and enhancements as needed. Event organizers can also include businesses and brands that are outside the venue, but still may want to participate in the event in some way.

aa. sell the physical space (e.g., creation of virtual real estate surrounding a venue that show up in an augmented reality as a place for interactions, some of which may include promotional activities to direct selling of product) throughout the festival or venue site, including specifically designated space surrounding consumer vending areas, exclusive VIP lounges or branded stages located throughout the festival and venue site. As patrons walk by or stop to view a performance by an artist or band, they will get a promotional benefit notification from the vendor, artist, brand or corporate sponsor on their mobile device through control structure. This revolutionary method of advertising and marketing will enhance the sponsor's activation capabilities, creating added value, and most importantly, a new innovative method to expand reach to consumers by the event's brand and corporate sponsor partners.

bb. acquire information and deep data analytics about the transactions and trend interactions that occur during the festival with information collected about the patron when they registered their control structure profile which will deliver beneficial demographics and data that will become effective tools for future strategic planning.

cc. enable festival organizers and ticketing department to see how many control structure fans are physically in the venue by ticket category (1 Day, 2 Day, 3 Day or VIP Pass). Also, this will provide specific data on the types of interactions that are taking place, when and where, all in real time.

dd. locate people by name (semantically the same as friend finder) or by role. For example—where is the closest production manager, security team leader, transportation chief, artist relation's manager, or decision maker when time is of the essence? Festival Organizers and production staff depend primarily on radio communication to locate each other and troubleshoot issues as they arise. With control structure, key staff and executives can have an accurate and specific overview of staff coverage and their locations at all time within the festival site or venue. Locating each other more effectively results in greater efficiency with internal logistics and communication.

ee. give artists the ability to distribute and sell their music, share promotional and marketing content and messaging to their fan base. Build an online digital network of fans—the music finds them, and the fan community is built through control structure to control structure communication. control structure enable handheld mobile devices can seek out similarities of genre and tastes with other control structure users, and communicate and share those things with each other.

ff. give fans the ability to discover new music, artists and bands and download their music. Use of control structure's augmented reality navigator for venues; a navigation tool and semantic network that comes alive creating layers of enriched experiences on top of any eco-system through virtual and real-time reality that will provide users information about specific venues or festivals, sponsors, vendors, bands, special events, promotions, coupons, virtual real estate, things that are cool and unique and offer cache—"things that I want to find me, versus me having to spend time trying to find them."

gg. give an activated virtual space that could be offered to, and by, corporate sponsors—control structure could offer additional delivery methods for activations at large scale events. It would just be a reallocation of existing marketing and advertising budgets that already exist—control structure just offers an innovative and effective way to deliver the activation—another method that did not exist before.

hh. give branded stages at festivals a specific space surrounding the stage that has the ability to provide additional marketing and activation to control structure enabled handheld mobile devices.

ii. a navigation tool foremost, a mobile device application that sees an augmented reality of an event through virtual eyes—the eyes of control structure. What a user sees through those eyes is a semantic network(s) that comes alive as they engage in its ecosystem around—what they "see" through the eyes of control structure is information about the festival, sponsors, vendors, bands, special events, promotions, coupons, virtual real estate, things that are cool and unique and offer cache, things that the user wants to find them, versus them having to spend time trying to find the things.

jj. get notifications about bands "like" the bands you like playing near you kk. have control structure recommend a band based on similar songs or maybe an instrument or styles.

ll. artist recommends a song from another artist to followers.

mm. virtual concerts where you can watch a streamed show for some variable fee.

nn. enable audience (live and virtual) to give live feedback during a show that shows up on an ambient status orb.

oo. offer a friends list mashup where you play random songs from your friends list and you get to are the songs from that list. Users then have an overall rating for their individual list.

pp. give access to aggregate vendor ratings for the bands so the sponsors can understand the marketability of the band for potential sponsorship.

Although the invention has been described in terms of exemplary embodiments/features, it is not limited thereto. Rather, the foregoing description should be construed broadly to include other variants and embodiments of the invention, which may be made by those skilled in the art without departing from the scope and range of equivalents of the invention. This disclosure is intended to cover any adaptations or variations of the embodiments discussed herein.

The methods and apparatus as described above with reference to the foregoing description and appended drawings are hereby claimed.

The invention claimed is:

1. A method of executing a program structure by leveraging a peer-to-peer network, the method comprising:
generating a program structure comprising a plurality of program instructions at a first of a plurality of network peers, wherein at least one of said program instructions of the program structure controls the manner in which at least a portion of said program structure is executed;
executing a first portion comprising fewer than all of said program instructions of the program structure in the first network peer, said first portion initiating the execution of code hosted by said first network peer, wherein at least one of the executed program instructions determines, by its execution, that said first network peer should migrate a second portion comprising fewer than all of said program instructions of the program structure to at least one other of said plurality of network peers;
migrating the second portion of the program instructions of the program structure, together with any requisite data, to said at least one other of the plurality of network peers in response to said determination by said at least one executed program instruction; and
continuing execution of the one or more program instructions at said at least one other network peer.

2. The method of claim 1, wherein at least one of the program instructions comprises one or more other program structures.

3. The method of claim 2, wherein at least one of said program instructions controls at least one of the initiation of program instruction execution and the manner of program instruction execution.

4. The method of claim 3, wherein at least one program instruction causes the first network peer to apply different levels of control to different program instructions and any requisite data.

5. The method of claim 1, wherein said first network peer migrates the entire program structure, together with any requisite data, to the at least one other network peer for continued execution of said program structure.

6. The method of claim 1, further comprising writing and inserting one or more program instructions into the program structure after the program structure has begun execution.

7. The method of claim 1, wherein at least one program instruction controls at least one of the initiation of code execution and the manner in which said code is executed.

8. The method of claim 7, wherein at least one program instruction causes the first network peer to apply different levels of control to the initiation and manner of code execution and any requisite data.

9. The method of claim 1, wherein at least one program instruction comprises constraints, said constraints comprising one or more of a time to perform, a cost to perform, a quality to perform, a performance metric to perform, a software metric to perform, a reuse metric to perform, a router metric to perform, a connection metric to perform, a connectivity metric to perform, a networking metric to perform, a social metric to perform, a data analytic metric to perform, a data collection metric to perform, a user experience to perform, a quantitative metric to perform, a qualitative metric to perform, a priority to perform, and a location to perform one or more program instructions.

10. The method of claim 1, wherein at least one program instruction causes the insertion or deletion of one or more program instructions into the program structure.

11. The method of claim 10, wherein the program structure comprises at least one program instruction indicating a starting position within the program structure, the method further comprising executing at least one deletion instruction for deleting all program instructions between the starting position and said deletion instruction.

12. The method of claim 10, wherein at least one program instruction causes the insertion or deletion of one or more program instructions into or out of the program structure in real-time.

13. The method of claim 10, further comprising the first network peer modifying the program structure in response to a triggering event, said triggering event comprising at least one of an interrupted execution, a failed execution, and a completed execution of one or more program instructions.

14. The method of claim 13, wherein modifying the program structure comprises at least one of writing and inserting one or more new program instructions into the program structure, and deleting one or more of the program instructions.

15. The method of claim 1, wherein the migrating step comprises:
said first peer querying one or more network peers to identify the at least one other network peer; and
transferring one or more program instructions, together with any requisite data, to said at least one other network peer, wherein said first network peer comprises a network peer in possession of the program structure and wherein said at least one other peer comprises a network peer identified as capable of continuing execution of the transferred program instructions.

16. The method of claim 15, wherein the first network peer, in response to said querying step, receives information relating to one or more capabilities of one or more of the plurality of network peers, the method further comprising:
creating and storing a record of said capabilities; and
evaluating said record to identify said at least one other network peer.

17. The method of claim 1, further comprising repeating the migrating step until one or more objectives of the program structure are achieved.

18. The method of claim 1, wherein each program instruction of the program structure comprises meta-data that provides information relating to the functional capabilities required to carry-out one or more program instructions, and wherein said meta-data is readable by each of the plurality of network peers, the method further comprising:
said first network peer reading said meta-data and determining whether said first network peer hosts the appropriate code for execution in accordance with one or more program instructions.

19. The method of claim 18, wherein the first network peer encounters at least one program instruction that calls for the execution of code that is not hosted by said first network peer, and wherein the at least one other network peer is identified as hosting and as being capable of executing said code, the method further comprising:
migrating said at least one program instruction together with any requisite data, to said at least one other network peer,
said at least one other network peer executing the code called for by said at least one program instruction.

20. The method of claim 1, wherein at least one program instruction causes the first network peer to generate at least one program instruction, and wherein a portion of the requisite data comprises control data.

21. The method of claim 20, wherein initiation of the migrating step triggers execution of the at least one program instruction, said program instruction utilizing the control data during execution.

22. The method of claim 20, wherein at least one program instruction causes the at least one other network peer to generate at least one program instruction that is different than the least one program instruction generated by the first network peer.

23. The method of claim 1, further comprising writing and inserting the at least one program instruction into the program structure after the program structure has begun execution, said at least one program instruction causing the program structure to write or delete control data.

24. The method of claim 1, wherein the plurality of network peers comprises one or more selected from the group consisting of personal computers, servers, mobile telephones, pagers, personal digital assistant (PDA), radio frequency identification (RFID) devices, data sensors, kiosks, automatic teller machines (ATMs), wireless fidelity (WiFi) access points, routers, embedded multi-dimensional barcodes, global positioning (GPS) devices, gaming devices, multi-media devices, cable set-top boxes, digital still and motion cameras, surveillance equipment, healthcare monitoring equipment, medical imaging devices, point-of-sale terminals, mobile entertainment devices, embedded devices, audio devices, video devices, banking and payment-processing devices, cloud storage and computing devices and data centers and assembly line components, inventory and supply chain management devices, database devices, broadcasting, telecommunications, terrestrial and cable communications.

25. The method of claim 1, wherein said one or more of said program instructions migrated to said at least one other of said plurality of network peers comprises said second portion of said program instructions when it is determined that said first network peer cannot execute said second portion of the program instructions.

26. A system for executing a program structure by leveraging a peer-to-peer network, the system comprising:
a plurality of network peers in communication with each other, each of said network peers comprising a memory for storing code, and a processor for executing said code, at least a first of said network peers comprising code that when executed causes said first network peer to:
generate a program structure comprising a plurality of program instructions, wherein at least one of said program instructions of the program structure controls the manner in which at least a portion of said program structure is executed;
execute a first portion comprising fewer than all of said program instructions of the program structure which initiate the execution of additional code hosted by said first network peer, wherein at least one of the executed program instructions determines, by its execution, that said first network peer should migrate a second portion comprising fewer than all of said program instructions of the program structure to at least one other of said plurality of network peers;
migrate the second portion of the program instructions of the program structure, together with any requisite data, to at least one other of the plurality of network peers in response to said determination by said at least one executed program instruction; and
continue execution of one or more program instructions received from any other of the network peers.

27. The system of claim 26, wherein at least one of said network peers comprises code that when executed, causes said network peer to write and insert one or more program instructions into the program structure to control the manner in which said program structure is executed, said program instructions comprising constraints, said constraints comprising one or more of a time to perform, a cost to perform, a priority to perform, a quality to perform, a performance metric to perform, a software metric to perform, a reuse metric to perform, a router metric to perform, a connection metric to perform, a connectivity metric to perform, a networking metric to perform, a social metric to perform, a data analytic metric to perform, a data collection metric to perform, a user experience to perform, a quantitative metric to perform, a qualitative metric to perform, and a location to perform one or more program instructions.

28. The system of claim 26, wherein at least said first network peer comprises code that when executed causes said first network peer, in response to one or more program instructions, to insert or delete one or more program instructions into or out of the program structure after the program structure has begun execution.

29. The system of claim 26, wherein at least said first network peer comprises code that when executed causes said first network peer to query one or more network peers to identify at least one other peer; and to transfer one or more program instructions, together with any requisite data, to said at least one other network peer,
wherein said at least one other network peer comprises a network peer identified as capable of continuing execution of transferred program instructions.

30. The system of claim 29, wherein said first network peer, in response to said querying step, receives information relating to one or more capabilities of one or more of the plurality of network peers, at least said first network peer further comprising:
code that when executed, causes said first network peer to create and store a record of said capabilities; and evaluate said record to identify said at least one other network peer.

31. The system of claim 26, wherein at least one of the program instructions comprises one or more other program structures.

32. The system of claim 31, wherein at least one of said program instructions controls at least one of the initiation of program instruction execution and the manner of program instruction execution.

33. The system of claim 32, wherein at least the first network peer comprises code that when executed causes said first network peer to apply different levels of control to different program instructions and any requisite data in response to at least one program instruction.

34. The system of claim 26, wherein at least one of said program instructions controls at least one of the initiation of code execution and the manner in which said code is executed.

35. The system of claim 34, wherein at least the first network peer comprises code that when executed causes said first network peer to apply different levels of control to the initiation and manner of code execution and any requisite data in response to at least one program instruction.

36. The system of claim 26, wherein each program instruction of the program structure comprises meta-data that provides information relating to the functional capabilities required to carry-out one or more of said program instructions, and wherein said meta-data is readable by each of the plurality of network peers.

37. The system of claim 36, wherein said first network peer comprises code that when executed causes said first network peer to read said meta-data and determine whether said first network peer hosts the appropriate code for execution in accordance with one or more program instructions.

38. The system of claim 26, wherein at least the first network peer comprises code that when executed causes said first network peer to generate at least one program instruction in response to at least one other program instruction, and wherein a portion of the requisite data comprises control data.

39. The system of claim 38, wherein initiation of the migrating step triggers execution of the at least one program instruction, said program instruction utilizing the control data during execution.

40. The system of claim 38, wherein at least one program instruction causes the at least one other network peer to generate at least one program instruction that is different than the at least one program instruction generated by the first network peer.

41. The system of claim 26, wherein at least said first network peer further comprises code that when executed causes said first network peer to write and insert at least one program instruction into the program structure after the program structure has begun execution, said at least one program instruction causing the program structure to write or delete control data.

42. The system of claim 26, wherein the program structure comprises at least one program instruction indicating a starting position within the program structure, at least the first network peer comprising code that when executed causes said first network peer to execute at least one deletion instruction for deleting all program instructions between the starting position and said deletion instruction.

43. The system of claim 26, wherein at least one program instruction causes the insertion or deletion of one or more program instructions into or out of the program structure in real-time.

44. The system of claim 26, wherein the plurality of network peers comprises one or more selected from the group consisting of personal computers, servers, mobile telephones, pagers, personal digital assistant (PDA), radio frequency identification (RFID) devices, data sensors, kiosks, automatic teller machines (ATMs), wireless fidelity (WiFi) access points, routers, embedded multi-dimensional barcodes, global positioning (GPS) devices, gaming devices, multi-media devices, cable set-top boxes, digital still and motion cameras, surveillance equipment, healthcare monitoring equipment, medical imaging devices, point-of-sale terminals, mobile entertainment devices, embedded devices, audio devices, video devices, banking and payment-processing devices, cloud storage and computing devices and data centers and assembly line components, inventory and supply chain management devices, database devices, broadcasting, telecommunications, terrestrial and cable communications.

45. The system of claim 26, wherein at least the first network peer comprises code that when executed causes said first network peer to modify the program structure in response to a triggering event, said triggering event comprising at least one of an interrupted execution, a failed execution, and a completed execution of one or more program instructions.

46. The system of claim 45, wherein said first network peer is configured for modifying the program structure via at least one of writing and inserting one or more new program instructions into the program structure, and deleting one or more of the program instructions.

47. The system of claim 26, wherein said one or more of said program instructions migrated to said at least one other of said plurality of network peers comprises said second portion of the program instructions when it is determined that said first network peer cannot execute said second portion of the program instructions.

48. The system of claim 26, wherein said first network peer comprises code that when executed causes said first network peer to migrate said entire program structure, together with any requisite data, to said at least one other network peer for continued execution of said program structure.

49. The system of claim 26, wherein said first network peer or said at least one other of said plurality of network peers comprises code that when executed causes said first network peer or the at least one other of said plurality of network peers to write and insert one or more program instructions into said program structure after said program structure has begun execution.

50. The system of claim 26, wherein said migrating is repeated until one or more objectives of said program structure are achieved.

51. The system of claim 26, wherein:
at least one program instruction calls for the execution of code that is not hosted by said first network peer;
said at least one other network peer is identified as hosting and as being capable of executing said code; and
said first network peer comprises code that when executed causes said first network peer to migrate said at least one program instruction, together with any requisite data, to said at least one other network peer, said at least one other network peer executing said code called for by said at least one program instruction.

* * * * *